United States Patent
Yasoshima

(10) Patent No.: US 8,560,315 B2
(45) Date of Patent: Oct. 15, 2013

(54) CONFERENCE SUPPORT DEVICE, CONFERENCE SUPPORT METHOD, AND COMPUTER-READABLE MEDIUM STORING CONFERENCE SUPPORT PROGRAM

(75) Inventor: Mizuho Yasoshima, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 887 days.

(21) Appl. No.: 12/659,570

(22) Filed: Mar. 12, 2010

(65) Prior Publication Data

US 2010/0250252 A1 Sep. 30, 2010

(30) Foreign Application Priority Data

Mar. 27, 2009 (JP) ................................. 2009-079511

(51) Int. Cl.
| | | |
|---|---|---|
| *G10L 17/00* | (2013.01) | |
| *G10L 15/00* | (2013.01) | |
| *G10L 15/06* | (2013.01) | |
| *G10L 13/08* | (2013.01) | |
| *G10L 21/00* | (2013.01) | |
| *G10L 15/26* | (2006.01) | |
| *G10L 13/00* | (2006.01) | |

(52) U.S. Cl.
USPC ........... 704/246; 704/231; 704/235; 704/243; 704/258; 704/260; 704/261; 704/270; 704/270.1; 704/275

(58) Field of Classification Search
USPC ......... 704/231, 235, 243, 246, 258, 260, 261, 704/270, 270.1, 275
See application file for complete search history.

(56) References Cited

U.S. PATENT DOCUMENTS

| | | | | |
|---|---|---|---|---|
| 6,151,619 | A * | 11/2000 | Riddle | 709/204 |
| 6,816,468 | B1 * | 11/2004 | Cruickshank | 370/260 |
| 6,853,716 | B1 * | 2/2005 | Shaffer et al. | 379/202.01 |
| 7,203,645 | B2 * | 4/2007 | Pokhariyal et al. | 704/251 |
| 7,792,263 | B2 * | 9/2010 | D'Amora et al. | 379/202.01 |
| 7,844,454 | B2 * | 11/2010 | Coles et al. | 704/235 |
| 7,933,226 | B2 * | 4/2011 | Woodruff et al. | 370/260 |
| 7,949,118 | B1 * | 5/2011 | Edamadaka et al. | 379/202.01 |
| 7,979,059 | B2 * | 7/2011 | Rockefeller et al. | 455/414.1 |
| 8,325,213 | B2 * | 12/2012 | Lamb et al. | 348/14.01 |
| 8,380,521 | B1 * | 2/2013 | Maganti et al. | 704/275 |
| 2001/0054071 | A1 * | 12/2001 | Loeb | 709/205 |
| 2002/0109770 | A1 * | 8/2002 | Terada | 348/14.08 |
| 2002/0181683 | A1 * | 12/2002 | Mani | 379/201.01 |
| 2002/0184346 | A1 * | 12/2002 | Mani | 709/220 |

(Continued)

FOREIGN PATENT DOCUMENTS

JP        A-2002-344915        11/2002

*Primary Examiner* — Edgar Guerra-Erazo
(74) *Attorney, Agent, or Firm* — Oliff & Berridge, PLC

(57) ABSTRACT

A conference support device includes an image receiving portion that receives captured images from conference terminals, a voice receiving portion that receives, from one of the conference terminals, a voice that is generated by a first participant, a first storage portion that stores the captured images and the voice, a voice recognition portion that recognizes the voice, a text data creation portion that creates text data that express the words that are included in the voice, an addressee specification portion that specifies a second participant, whom the voice is addressing, an image creation portion that creates a display image that is configured from the captured images and in which the text data are associated with the first participant and a specified image is associated with at least one of the first participant and the second participant, and a transmission portion that transmits the display image to the conference terminals.

20 Claims, 20 Drawing Sheets

(56) References Cited

U.S. PATENT DOCUMENTS

| | | | |
|---|---|---|---|
| 2002/0188744 A1* | 12/2002 | Mani | 709/231 |
| 2003/0025786 A1* | 2/2003 | Norsworthy | 348/14.08 |
| 2003/0125954 A1* | 7/2003 | Bradley et al. | 704/270 |
| 2003/0130016 A1* | 7/2003 | Matsuura et al. | 455/569 |
| 2003/0154084 A1* | 8/2003 | Li et al. | 704/273 |
| 2003/0187632 A1* | 10/2003 | Menich | 704/1 |
| 2003/0231746 A1* | 12/2003 | Hunter et al. | 379/88.01 |
| 2004/0125877 A1* | 7/2004 | Chang et al. | 375/240.28 |
| 2006/0026002 A1* | 2/2006 | Potekhin et al. | 704/275 |
| 2006/0053042 A1* | 3/2006 | Yoshimura et al. | 705/8 |
| 2006/0100880 A1* | 5/2006 | Yamamoto et al. | 704/270 |
| 2006/0259755 A1* | 11/2006 | Kenoyer | 713/1 |
| 2007/0011233 A1* | 1/2007 | Manion et al. | 709/204 |
| 2007/0071206 A1* | 3/2007 | Gainsboro et al. | 379/168 |
| 2007/0074123 A1* | 3/2007 | Omura et al. | 715/753 |
| 2007/0083666 A1* | 4/2007 | Apelbaum | 709/231 |
| 2007/0115388 A1* | 5/2007 | Apelbaum | 348/430.1 |
| 2007/0121530 A1* | 5/2007 | Vadlakonda et al. | 370/260 |
| 2007/0133437 A1* | 6/2007 | Wengrovitz et al. | 370/260 |
| 2007/0188597 A1* | 8/2007 | Kenoyer | 348/14.08 |
| 2008/0232556 A1* | 9/2008 | Gilbert et al. | 379/88.01 |
| 2009/0198490 A1* | 8/2009 | Eckhart et al. | 704/215 |
| 2011/0301952 A1* | 12/2011 | Koshinaka et al. | 704/235 |
| 2012/0033796 A1* | 2/2012 | Gilbert et al. | 379/202.01 |
| 2012/0035930 A1* | 2/2012 | Gilbert et al. | 704/251 |

\* cited by examiner

| TERMINAL ID | USER ID | NAME | FILE NAME |
|---|---|---|---|
| 4 | A0001 | AAAA | A. jpg |
| 4 | B0001 | BBBB | B. jpg |
| 5 | C0001 | CCCC | C. jpg |
| 5 | D0001 | DDDD | D. jpg |
| 5 | E0001 | EEEE | E. jpg |
| 6 | F0001 | FFFF | F. jpg |

| USER ID | NAME | ARRANGEMENT INFORMATION | FILE NAME |
|---------|------|-------------------------|-----------|
| A0001 | AAAA | (a, y) | A.jpg |
| B0001 | BBBB | (b, y) | B.jpg |

3121

| USER ID | NAME | FILE NAME |
|---------|------|-----------|
| A0001   | AAAA | A. jpg    |
| B0001   | BBBB | B. jpg    |
| X0001   | XXXX | X. jpg    |
| :       | :    | :         |

CONFERENCE SUPPORT DEVICE, CONFERENCE SUPPORT METHOD, AND COMPUTER-READABLE MEDIUM STORING CONFERENCE SUPPORT PROGRAM

CROSS-REFERENCE TO RELATED APPLICATION

This application claims priority to Japanese Patent Application No. 2009-079511, filed Mar. 27, 2009, the disclosure of which is hereby incorporated by reference in its entirety.

BACKGROUND

The present disclosure relates to a conference support device, a conference support method, and a computer-readable medium that stores a conference support program that are capable of converting spoken words into text and displaying the text.

In a known video conference system, captured images of conference participants who are participating in a video conference are displayed on a display. The voices of the conference participants who are participating in the video conference are output from a speaker. The demeanor of a conference participant in a remote location can be apprehended based on the captured image that is displayed on the display and the voice that is output from the speaker.

Cases occur in which a conference participant fails to hear a conversation among the other participants. A device has been disclosed that addresses this problem by converting spoken words into text and displaying the text on the display. The text is associated with the corresponding captured image of the participant that is displayed on the display. By looking at the displayed text, the participant can determine, after the fact, what was said in the conversation among the other participants.

SUMMARY

However, in a case where a participant is not paying attention to the conversation among the other participants, the participant may not notice that his or her own name has been called unexpectedly. In this sort of case, even if the device that is described above is being used, the participant cannot immediately apprehend the text that is being displayed and therefore cannot participate in the conversation.

The present disclosure provides a conference support device, a conference support method, and a computer-readable medium that stores a conference support program that make it possible for a conference participant to easily recognize that the conference participant is being addressed.

Exemplary embodiments provide a conference support device that, by controlling communication among a plurality of conference terminals, supports a video conference that is conducted among conference participants who are using the conference terminals. The conference support device includes an image receiving portion, a voice receiving portion, a first storage portion, a voice recognition portion, a text data creation portion, an addressee specification portion, an image creation portion, and a transmission portion. The image receiving portion receives, from the plurality of the conference terminals, captured images that are captured by image capture devices of the conference terminals and in each of which at least one of the conference participants is visible. The voice receiving portion receives, from a first conference terminal that is one of the pluralities of the conference terminals, a voice that is generated by a first participant, who is the conference participant who is using the first conference terminal, the voice being input from a voice input device of the first conference terminal. The first storage portion stores the captured images that are received by the image receiving portion and the voice that is received by the voice receiving portion. The voice recognition portion recognizes the voice that is stored in the first storage portion. Based on the result of the recognizing by the voice recognition portion, the text data creation portion creates text data that express words that are included in the voice. Based on the result of the recognizing by the voice recognition portion, the addressee specification portion specifies a second participant, who is the conference participant whom the voice is addressing. The image creation portion creates a display image that is to be displayed on display devices of the plurality of the conference terminals and from the captured images that are stored in the first storage portion. In the display image, the text data that are created by the text data creation portion are associated with a portion of the captured image that corresponds to the first participant, and a specified image is associated with a portion of the captured image that corresponds to at least one of the first participant and the second participant who is specified by the addressee specification portion. The transmission portion transmits, to the plurality of the conference terminals, the display image that is created by the image creation portion, in order for the display image to be displayed on the display devices of the plurality of the conference terminals.

Exemplary embodiments also provide a conference support method that, by controlling communication among a plurality of conference terminals, supports a video conference that is conducted among conference participants who are using the conference terminals. The conference support method includes a step of receiving, from the plurality of the conference terminals, captured images that are captured by image capture devices of the conference terminals and in each of which at least one of the conference participants is visible. The conference support method also includes a step of receiving, from a first conference terminal that is one of the plurality of the conference terminals, a voice that is generated by a first participant, who is the conference participant who is using the first conference terminal, the voice being input from a voice input device of the first conference terminal. The conference support method also includes a step of recognizing the voice that has been received. The conference support method also includes a step of creating text data that express words that are included in the voice, based on the result of the recognizing of the voice. The conference support method also includes a step of specifying, based on the result of the recognizing of the voice, a second participant, who is the conference participant whom the voice is addressing. The conference support method also includes a step of creating a display image that is to be displayed on display devices of the plurality of the conference terminals from the captured image that have been received, and in which the text data that have been created are associated with a portion of the captured image that corresponds to the first participant and a specified image is associated with a portion of the captured image that corresponds to at least one of the first participant and the second participant who has been specified. The conference support method also includes a step of transmitting the display image that has been created to the plurality of the conference terminals, in order for the display image to be displayed on the display devices of the plurality of the conference terminals.

Exemplary embodiments further provide a computer-readable medium that stores a conference support program for a conference support device that, by controlling communication among a plurality of conference terminals, supports a video conference that is conducted among conference participants who are using the conference terminals. The conference support program is executed by a computer of the conference support device and includes a step of receiving, from the plurality of the conference terminals, captured images that are captured by image capture devices of the conference terminals and in each of which at least one of the conference participants is visible. The conference support program also includes a step of receiving, from a first conference terminal that is one of the plurality of the conference terminals, a voice that is generated by a first participant, who is the conference participant who is using the first conference terminal, the voice being input from a voice input device of the first conference terminal. The conference support program also includes a step of recognizing the voice that has been received. The conference support program also includes a step of creating text data that express words that are included in the voice, based on the result of the recognizing of the voice. The conference support program also includes a step of specifying, based on the result of the recognizing of the voice, a second participant, who is the conference participant whom the voice is addressing. The conference support program also includes a step of creating a display image that is to be displayed on display devices of the plurality of the conference terminals from the captured images that have been received, and in which the text data that have been created are associated with a portion of the captured image that corresponds to the first participant and a specified image is associated with a portion of the captured image that corresponds to at least one of the first participant and the second participant who has been specified. The conference support program also includes a step of transmitting the display image that has been created to the plurality of the conference terminals, in order for the display image to be displayed on the display devices of the plurality of the conference terminals.

BRIEF DESCRIPTION OF THE DRAWINGS

Exemplary embodiments of the disclosure will be described below in detail with reference to the accompanying drawings in which:

FIG. 4 is a schematic figure that shows a log-in table;

FIG. 7 is a schematic figure that shows a log-in table;

DETAILED DESCRIPTION OF THE EXEMPLARY EMBODIMENTS

Hereinafter, a video conference system according to an embodiment of the present disclosure and a multipoint control unit (MCU) will be explained with reference to the drawings. The drawings are used for explaining technological features that the present disclosure can utilize. The device configurations, the flowcharts of the various types of processing, and the like are merely explanatory examples, and the present disclosure is not limited to only those examples.

Figure 1:
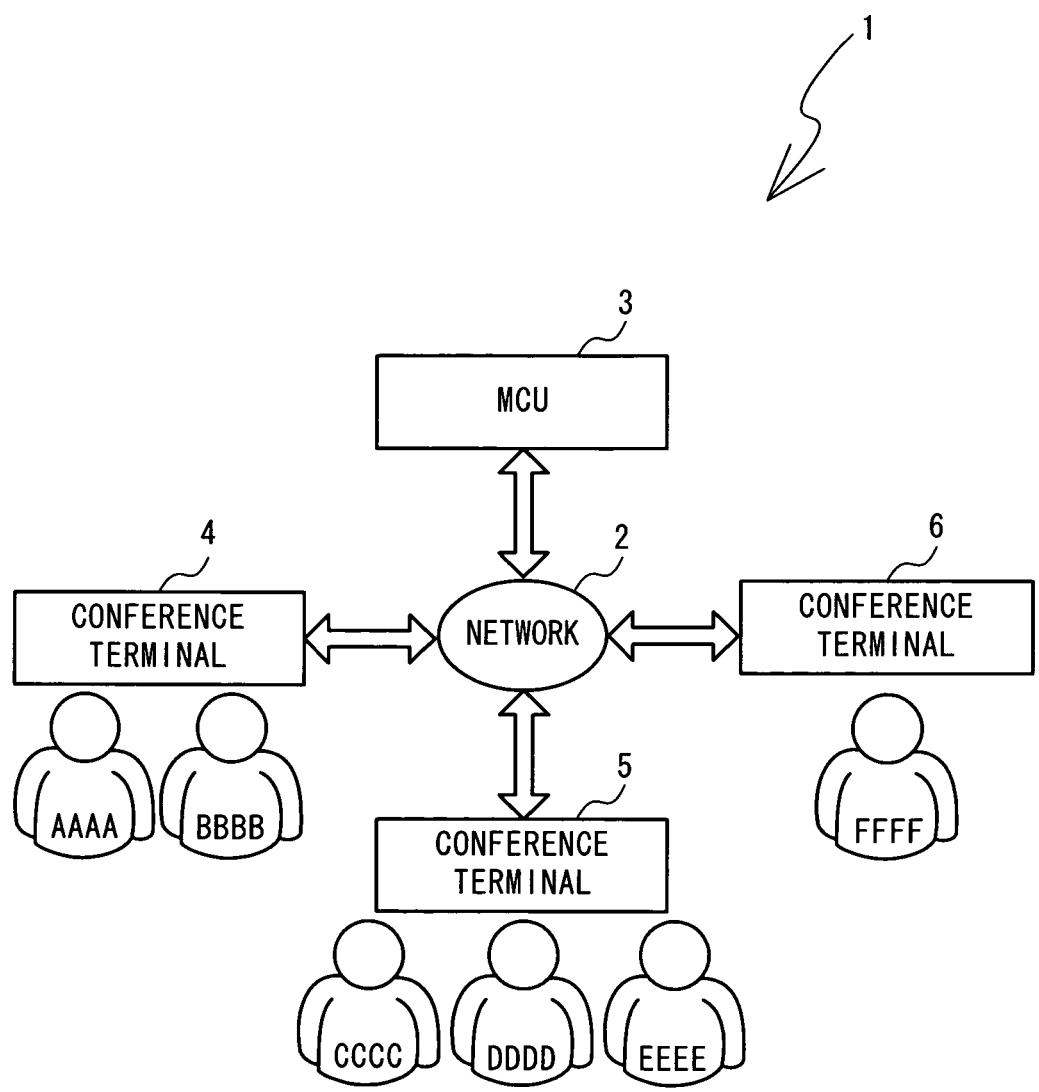
FIG. 1 is a schematic figure that shows an overview of a video conference system.

A configuration of a video conference system 1 that includes an MCU 3 will be explained with reference to FIG. 1. As shown in FIG. 1, the video conference system 1 is provided with the MCU 3 and conference terminals 4 to 6. The MCU 3 and the conference terminals 4 to 6 are connected through a network 2. In the video conference system 1, images that are captured (hereinafter called the captured images) and voices that are input in the conference terminals 4 to 6 are transmitted from the conference terminals 4 to 6 to the MCU 3. In the MCU 3, an image (hereinafter called the display image) that will be displayed on displays of the conference terminals 4 to 6 is created based on the captured images that have been received from the conference terminals 4 to 6. The created display image and the voice are transmitted from the MCU 3 to the conference terminals 4 to 6. The conference terminals 4 to 6 display the received display image on the displays. The conference terminals 4 to 6 output the received voices from speakers. A video conference is thus conducted.

A person who wishes to participate in the video conference places an RFID tag in contact with an RFID reader with which each of the conference terminals 4 to 6 is provided. This allows the person who wishes to participate to log into the video conference. Once the log-in is completed, a camera 34 that is provided in the conference terminal 4, for example, starts to capture an image. Sound that is captured by a microphone 35 that is provided in the conference terminal 4 starts to be recorded. The display image that has been created by the MCU 3 is displayed on displays 28 of the conference terminals 4 to 6. Voices that have been recorded from the other conference terminals are output from a speaker 37. Persons who have logged into the video conference (hereinafter called the conference participants) can recognize the captured images of the other conference participants that are included in the display image and can recognize the recorded voices of the other conference participants. Thus, the conference participants can participate in the video conference.

In FIG. 1, two persons (a person named AAAA (user ID: A0001) and a person named BBBB (user ID: B0001)) are participating in the video conference by using the conference terminal 4. Three persons (a person named CCCC (user ID: C0001), a person named DDDD (user ID: D0001), and a person named EEEE (user ID: E0001)) are participating in the video conference by using the conference terminal 5. One person named FFFF (user ID: F0001) is participating in the video conference by using the conference terminal 6.

The display image that is created by the MCU 3 includes at least the captured images that have been captured by the conference terminals 4 to 6. The MCU 3 performs voice recognition on the voices that are received from the conference terminals 4 to 6. Based on the results of the voice recognition, text data are created that express the words that are spoken by the voices. The created text data are associated with a portion of the captured images that corresponds to the conference participant who is speaking (hereinafter called the first participant). The conference participants visually recognize the display image that is displayed on the displays 28. The conference participants visually recognize the text data that are displayed in the display image. The conference participants can thus determine who the first participant is and what the first participant is saying.

Based on the results of the voice recognition, the MCU 3 specifies another conference participant (hereinafter called the second participant) who is addressed in the course of the conversation. A text data display frame is associated with a portion of the captured images that corresponds to the second participant. The conference participants visually recognize the display image that is displayed on the displays 28. The conference participants visually recognize the display frame that is shown within the display image. This makes it possible for the conference participants to determine who the second participant is. The conference participants can also recognize the person who is addressed in the course of the conversation.

Figure 2:
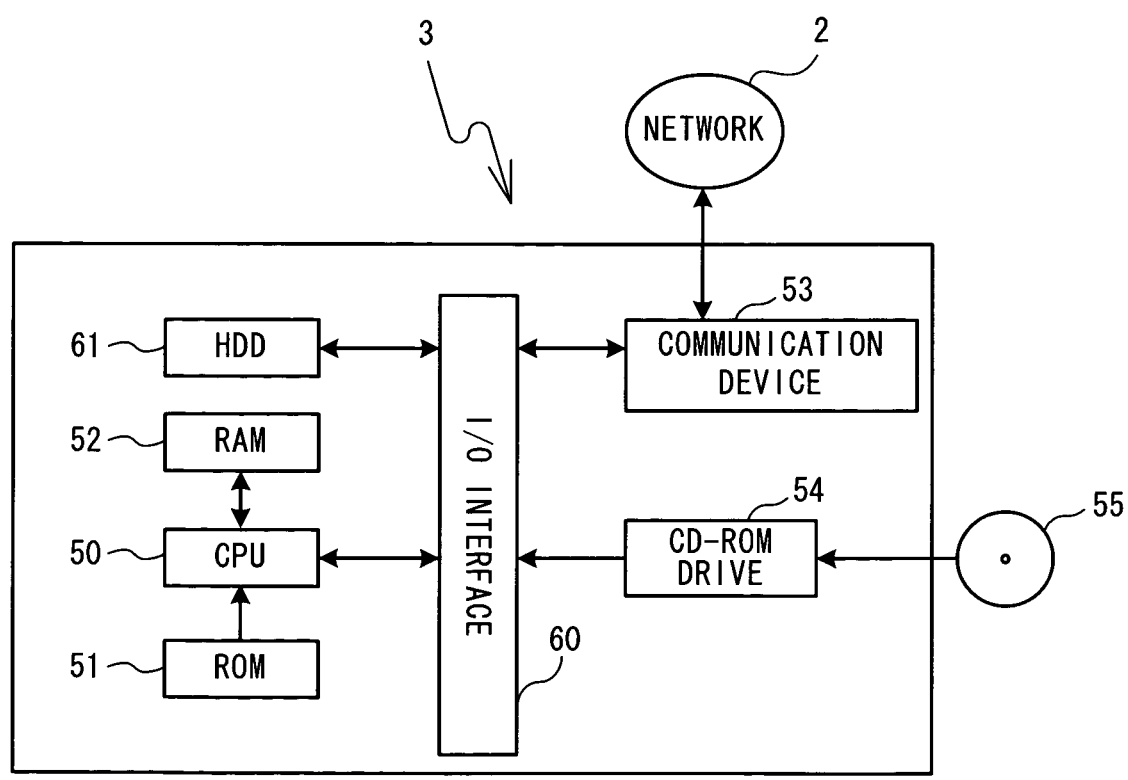
FIG. 2 is a block diagram that shows an electrical configuration of an MCU.

An electrical configuration of the MCU 3 will be explained with reference to FIG. 2. As shown in FIG. 2, the MCU 3 is provided with at least a CPU 50, a ROM 51, a RAM 52, a hard disk drive 61 (hereinafter called the HDD 61), and an I/O interface 60. The CPU 50 is a controller that performs control of the MCU 3. The ROM 51 stores a BIOS and the like. The RAM 52 stores various types of data temporarily. The I/O interface 60 performs mediation of data transfers. The HDD 61 has various types of storage areas. The CPU 50 is electrically connected to the ROM 51, the RAM 52, and the I/O interface 60. The HDD 61 is electrically connected to the I/O interface 60.

The MCU 3 is also provided with at least a communication device 53 and a CD-ROM drive 54.

The I/O interface 60 is electrically connected to the communication device 53 and the CD-ROM drive 54. The communication device 53 can perform communication through the network 2. A CD-ROM 55 is inserted into the CD-ROM drive 54. A main program, a communication control program, and the like for the MCU 3 are stored in the CD-ROM 55. When the CD-ROM 55 is inserted into the CD-ROM drive 54, the various types of programs are read from the CD-ROM 55 and are stored in a program storage area 616 of the HDD 61 (refer to FIG. 3).

Figure 3:
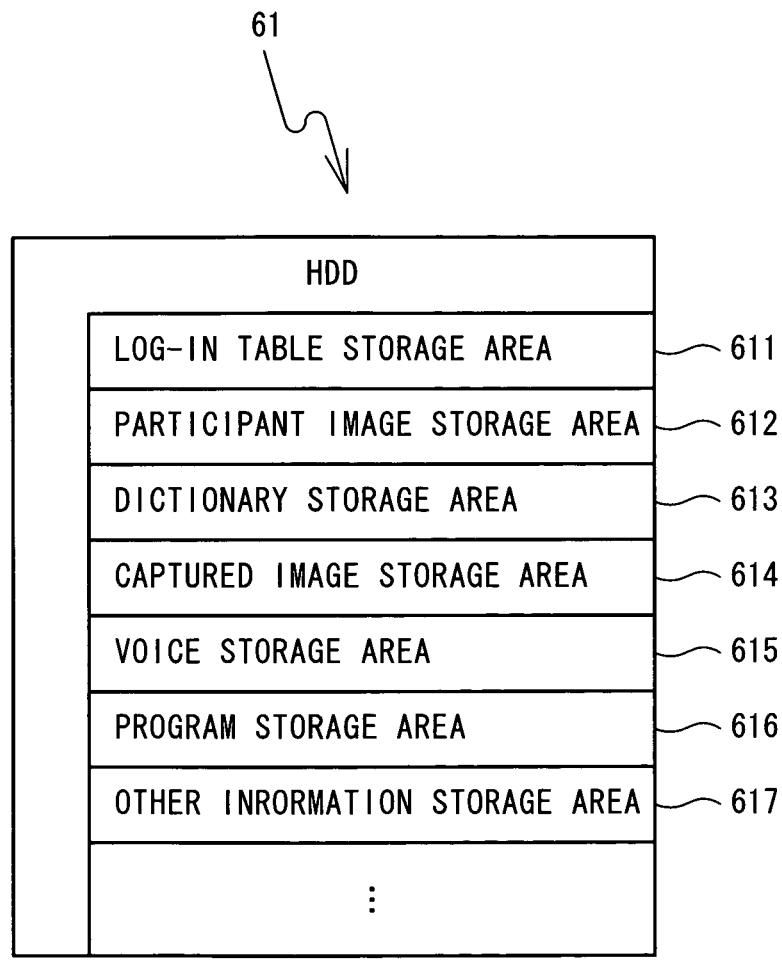
FIG. 3 is a schematic figure that shows storage areas on an HDD.

The various types of storage areas in the HDD 61 will be explained with reference to FIG. 3. A log-in table storage area 611, a participant image storage area 612, a dictionary storage area 613, a captured image storage area 614, a voice storage area 615, the program storage area 616, and an other information storage area 617 are provided in the HDD 61.

A log-in table (refer to FIG. 4) is stored in the log-in table storage area 611. The log-in table manages the conference participants who have logged into the video conference. Captured images of the conference participants (hereinafter called the participant images) that have been received from the conference terminals 4 to 6 are stored in the participant image storage area 612. A dictionary that is referenced when voice recognition processing is performed is stored in the dictionary storage area 613. Captured images that have been received from the conference terminals 4 to 6 are stored in the captured image storage area 614. Voices that have been received from the conference terminals 4 to 6 are stored in the voice storage area 615. The main program, the communication control program, and the like for the MCU 3 are stored in the program storage area 616. The communication control program is a program that performs communication with the conference terminals 4 to 6 in order for the video conference to be conducted. Other information that is used by the MCU 3 is stored in the other information storage area 617. In a case where the MCU 3 is a dedicated device that is not provided with the HDD 61, the various types of programs may be stored in the ROM 51.

The log-in table 6111 that is an example of the log-in table will be explained with reference to FIG. 4. Information that pertains to the conference participants is stored in the log-in table 6111. Specifically, terminal IDs for the conference terminals 4 to 6 that the conference participants use are stored in the log-in table 6111. User IDs for the conference participants are also stored in the log-in table 6111. The names of the conference participants are also stored in the log-in table 6111. File names for the participant images are also stored in the log-in table 6111. The participant images that correspond to the file names are stored in the participant image storage area 612.

Information that identifies the conference participants is stored as the user IDs. IDs of RFID tags that are read by RFID readers 36 of the conference terminals 4 to 6 (refer to FIG. 5) at log-in time are used as the user IDs. The terminal IDs are identification information that identifies the conference terminals 4 to 6. The MAC addresses, IP addresses, and the like of conference terminals 4 to 6 can be used as the terminal IDs. The names of the conference participants are stored as the names. The file names of the participant images of the conference participants are stored as the file names.

The information that is stored in the log-in table is included in registration information transmitted from the conference terminals 4 to 6 to the video conference at log-in time. The MCU 3 receives the registration information from the conference terminals 4 to 6. The MCU 3 stores in the log-in table the user IDs, the terminal IDs, the names, and the participant image file names that are included in the registration information. The participant images that are included in the registration information are stored in the participant image storage area 612.

In the example that is shown in FIG. 4, information on the conference participants who are using the conference terminals 4 to 6 in FIG. 1 ((Name: AAAA, User ID: A0001), (Name: BBBB, User ID: B0001), and the like) is stored in the log-in table 6111. The participant images that correspond to the file names A.jpg, B.jpg, and the like are stored in the participant image storage area 612.

Figure 5:
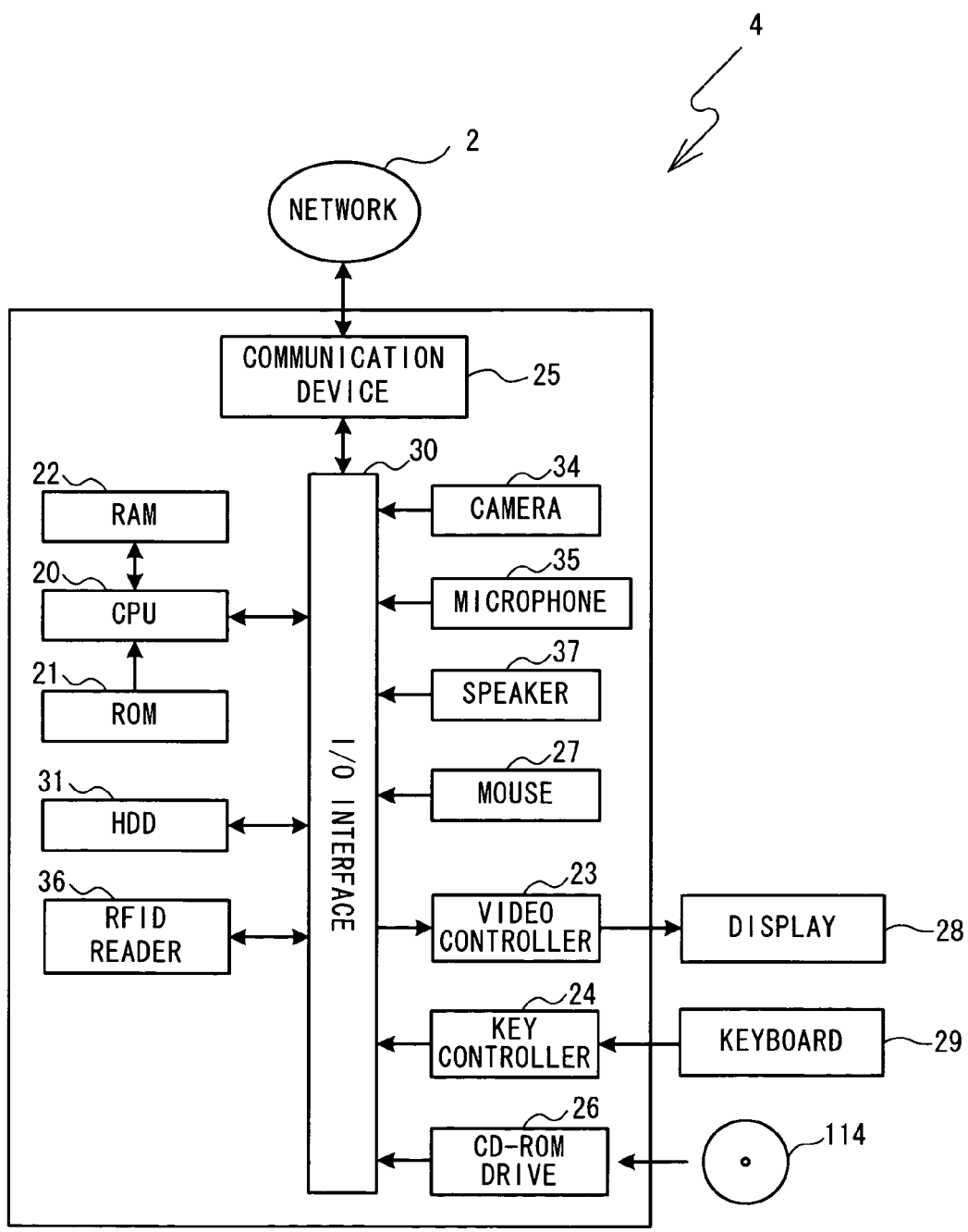
FIG. 5 is a block diagram that shows an electrical configuration of a conference terminal.

An electrical configuration of the conference terminal 4 will be explained with reference to FIG. 5. All of the conference terminals 4 to 6 have the same configuration. Only the electrical configuration of the conference terminal 4 will be explained. Explanations of the electrical configurations of the other conference terminals 5, 6 will be omitted.

The conference terminal 4 is provided with at least a CPU 20, a ROM 21, a RAM 22, and an I/O interface 30. The CPU 20 is a controller that performs control of the conference terminal 4. The ROM 21 stores a BIOS and the like. The RAM 22 stores various types of data temporarily. The I/O interface 30 performs mediation of data transfers. The CPU 20 is electrically connected to the ROM 21, the RAM 22, and the I/O interface 30.

The conference terminal 4 is provided with at least a communication device 25, a hard disk drive 31 (hereinafter called the HDD 31), the RFID reader 36, the camera 34, the microphone 35, the speaker 37, a mouse 27, a video controller 23, a key controller 24, and a CD-ROM drive 26. The I/O interface 30 is electrically connected to the communication device 25, the HDD 31, the RFID reader 36, the camera 34, the microphone 35, the speaker 37, the mouse 27, the video controller 23, the key controller 24, and the CD-ROM drive 26. The communication device 25 performs communication through the network 2. The HDD 31 has various types of storage areas. The RFID reader 36 can read information in an RFID tag. The camera 34 captures an image of the user of the conference terminal 4. The microphone 35 can capture the voice of the user of the conference terminal 4. The speaker 37 outputs the voice. The video controller 23 is connected to the display 28. The key controller 24 is connected to a keyboard 29. A CD-ROM 114 is inserted into the CD-ROM drive 26. A main program, a communication control program, and the like for the conference terminal 4 are stored in the CD-ROM 114. When the CD-ROM 114 is inserted into the CD-ROM drive 26, the various types of programs are read from the CD-ROM 114 and are stored in a program storage area 316 of the HDD 31 (refer to FIG. 6).

Figure 6:
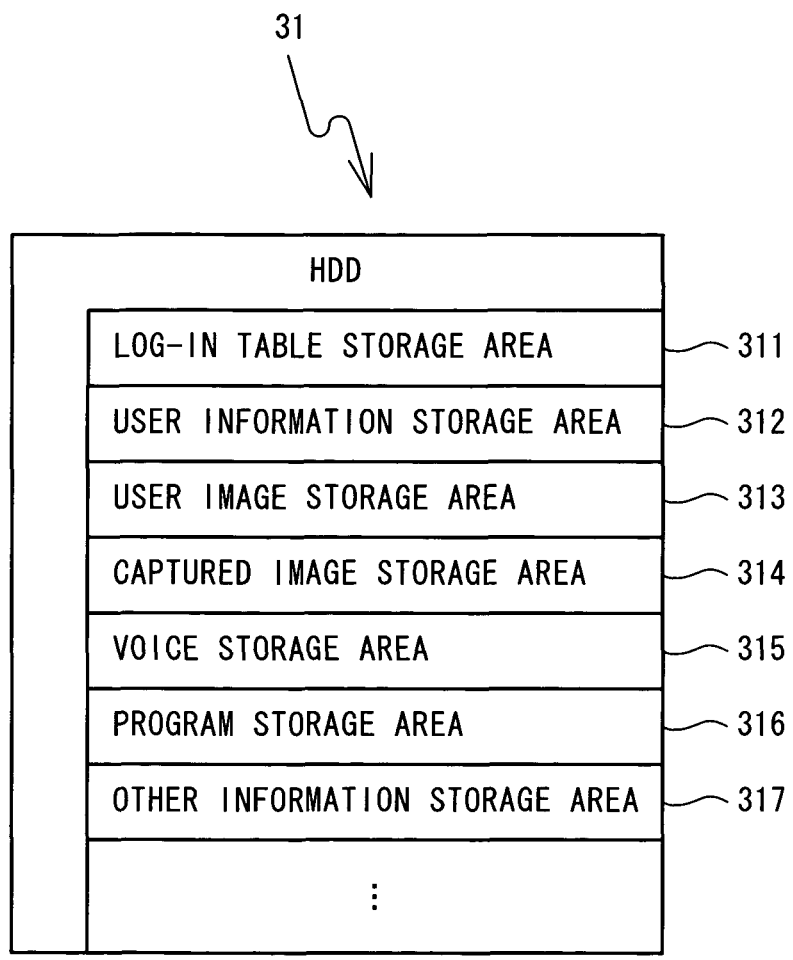
FIG. 6 is a schematic figure that shows storage areas on an HDD.

The various types of storage areas in the HDD 31 will be explained with reference to FIG. 6. A log-in table storage area 311, a user information storage area 312, a user image storage area 313, a captured image storage area 314, a voice storage area 315, the program storage area 316, and an other information storage area 317 are provided in the HDD 31.

A log-in table is stored in the log-in table storage area 311. The log-in table manages the conference participants who use the conference terminal 4. A user information table is stored in the user information storage area 312. The user information table manages the persons who use the conference terminal 4. Captured images of the persons who use the conference terminal 4 are stored in the user image storage area 313. Captured images that have been captured by the camera 34 of the conference terminal 4 are stored in the captured image storage area 314. Voices that have been input through the microphone 35 of the conference terminal 4 are stored in the voice storage area 315. The main program, the communication control program, and the like for the conference terminal 4 are stored in the program storage area 316. The communication control program conducts the video conference with the conference terminals 5, 6 by performing communication with the MCU 3. Other information that is used by the conference terminal 4 is stored in the other information storage area 317. In a case where the conference terminal 4 is dedicated device that is not provided with the HDD 31, the various types of programs are stored in the ROM 21.

The log-in table storage area 3111 that is an example of the log-in table will be explained with reference to FIG. 7. Information that pertains to the conference participants who use the conference terminal 4 is stored in the log-in table 3111. Specifically, the user IDs of the conference participants are stored in the log-in table 3111. The names of the conference participants are also stored in the log-in table 3111. Arrangement information that is information about the arrangement of the portions that correspond to the conference participants within the captured images that are captured during the video conference are also stored in the log-in table 3111. The file names for the participant images are also stored in the log-in table 3111. The participant images that correspond to the file names are stored in the user image storage area 313.

The details of the information that is stored as the user IDs, the names, and the file names are the same as for the information that is stored in the log-in table of the MCU 3. The user of the conference terminal 4 places the RFID tag in contact with the RFID reader 36. The ID of the RFID tag is read by the RFID reader 36. The ID that is read is stored as the user ID in the log-in table. The name and the file name that corresponds to the user ID that has been read are identified based on the user information table and are stored in the log-in table.

In the example that is shown in FIG. 7, information on the conference participants who using the conference terminal 4 in FIG. 1 ((Name: AAAA, User ID: A0001), (Name: BBBB, User ID: B0001)) is stored in the log-in table 3111. Coordinate data (a, y), (b, y) are stored as the arrangement information. The participant images that correspond to the file names A.jpg, B.jpg, and the like are stored in the user image storage area 313.

The user information table 3121 that is an example of the user information table will be explained with reference to FIG. 8. The user IDs and names of all users who may possibly use the conference terminal 4 to participate in the video conference are stored in the user information table 3121. The file names of the captured images of the users (hereinafter called the user images) are also stored in the user information table 3121. The user images that correspond to the file names are stored in the user image storage area 313. The IDs of the RFID tags that the users possess are stored as the user IDs. The names of the users are stored as the names.

The user IDs and the names are input in advance by the users of the conference terminal 4, for example, through the keyboard 29. The user images are acquired by using the camera 34 to capture images of the users. The images are captured by the camera 34 when the users input their user IDs and names, for example. The file names are automatically assigned to the acquired user images.

Figure 8:
FIG. 8 is a schematic figure that shows a user table.

In the example that is shown in FIG. 8, information on the conference participants using the conference terminal 4 in FIG. 1 ((Name: AAAA, User ID: A0001), (Name: BBBB, User ID: B0001)) is stored in the user information table 3121. Information on a user ((Name: XXXX, User ID: X0001)) who is not currently participating in the video conference is also stored in the user information table 3121. The user images that correspond to the file names A.jpg, B.jpg, and X.jpg are stored in the user image storage area 313.

Types of processing that are performed by the CPU 50 of the MCU 3 (image creation processing, receiving processing) will be explained with reference to FIGS. 9 to 13. These types of processing are performed by the CPU 50 when the power supply to the MCU 3 is turned on. These types of processing are performed in alternation on a specified cycle. These types of processing are also performed in alternation based on a priority ranking that is set in advance. This makes it possible to avoid a situation in which one type of processing is performed continuously while the other type of processing is not performed at all. In a case where one type of processing is started when the other type of processing is being performed, the type of processing that is being performed is temporarily suspended. The other type of processing is then performed instead. The next time that the suspended processing is performed, it is restarted from the point at which it was suspended.

Figure 9:
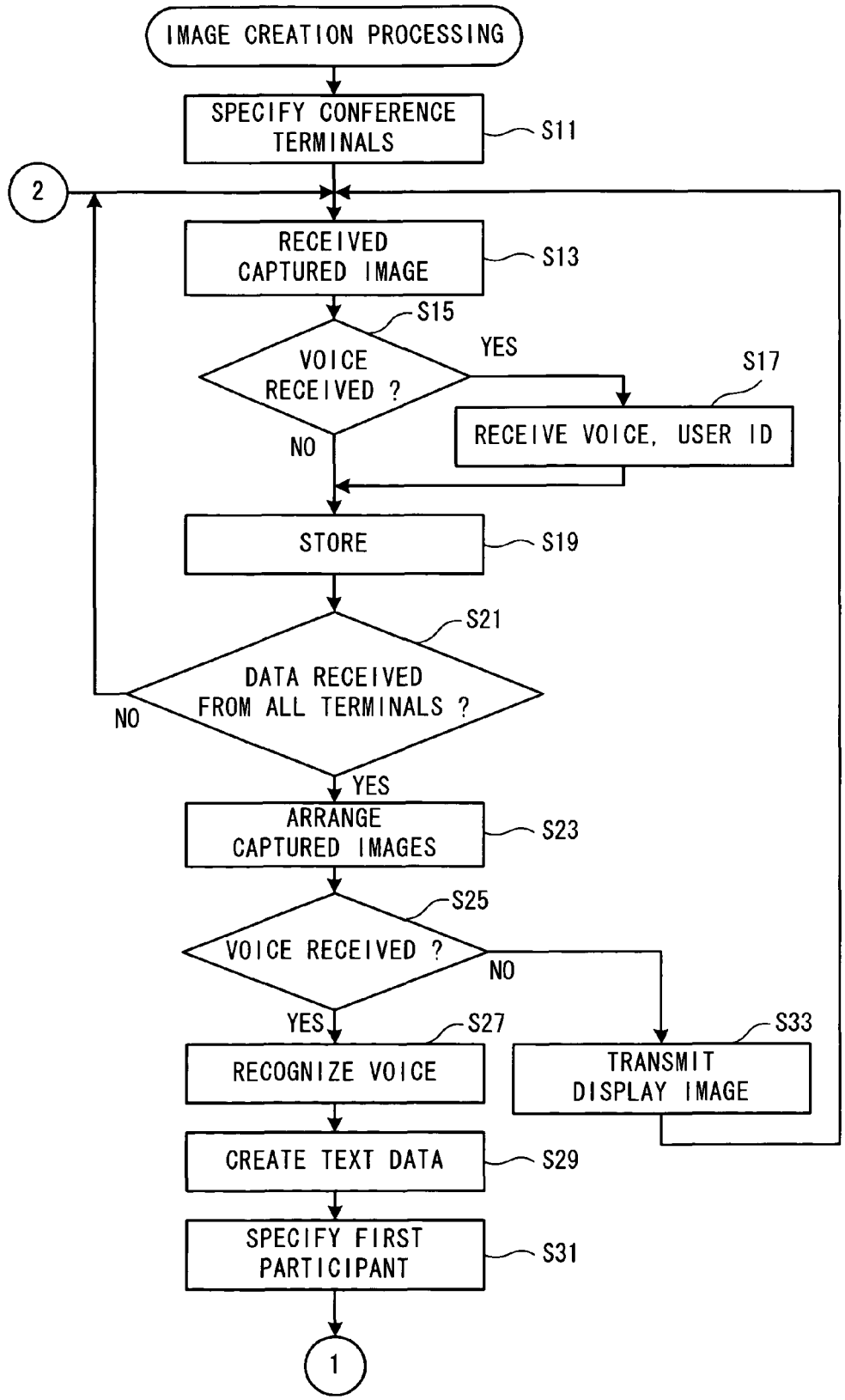
FIG. 9 is a flowchart that shows image creation processing.

The image creation processing will be explained with reference to FIG. 9. In the image creation processing, the display image is created that will be displayed on the displays 28 of the conference terminals 4 to 6. The display image is created based on the captured images that are received from the conference terminals 4 to 6.

The log-in table 6111 is referenced. The conference terminals 4 to 6 that are participating in the video conference are specified (Step S11). Communication data that include a captured image are received from one of the specified conference terminals 4 to 6 (Step S13). A determination is made as to whether the received communication data that include the captured image also include a voice (Step S15). In a case where communication data that include a voice are being transmitted (YES at Step S15), the communication data that include the voice are received. The user ID of the conference participant who is speaking is included in the communication data that include the voice. The user ID is received along with the communication data (Step S17). The processing proceeds to Step S19. In a case where the received communication data that include the captured image do not include a voice (NO at Step S15), the processing proceeds to Step S19.

In the processing at Step S19, the captured image that is included in the communication data that are received at Step S13 is stored in the captured image storage area 614. The captured image that is included in the received communication data is associated with the terminal ID of the conference terminal that transmitted the communication data. in a case where the communication data that include the voice and the user ID are received at Step S17, the voice, the user ID, and the terminal ID of the conference terminal that transmitted the communication data are stored in association with one another in the voice storage area 615 (Step S19).

A determination is made as to whether communication data that include a captured image have been received from all of the conference terminals that were specified at Step S11 (Step S21). In a case where a conference terminal remains from which communication data that include a captured image have not been received (NO at Step S21), the processing returns to Step S13. The processing that receives communication data that include a captured image from the remaining conference terminal is then performed.

In a case where communication data that include a captured image have been received from all of the conference terminals that are participating in the video conference (YES at Step S21), the display image is created that will be displayed on the displays 28 of the conference terminals 4 to 6. The display image is created based on the captured images that are stored in the captured image storage area 614. The captured images are arranged in display areas of the displays 28 of the conference terminals 4 to 6 such that they fit into the display areas (Step S23). The sizes of the captured images are adjusted such that the captured images do not overlap one another.

For example, in a case where a total of three conference terminals (the conference terminals 4 to 6) are participating in the video conference, as shown in FIG. 1, three captured images are received by the MCU 3. In this case, where the display areas of the displays 28 are each divided into four sub-areas, the captured images are arranged in three of the sub-areas. In a case where a total of two conference terminals are participating in the video conference, for example, two captured images are received by the MCU 3. In this case, where the display areas of the displays 28 are each divided into two sub-areas, the captured images are arranged in the corresponding sub-areas.

A determination is made as to whether communication data that include a voice have been received (Step S25). In a case where communication data that include a voice have not been received from even one of the conference terminals that are logged in (NO at Step S25), the display image that was created at Step S23 is transmitted to the logged-in conference terminals 4 to 6 (Step S33). The processing then returns to Step S13.

In a case where communication data that include a voice have been received (YES at Step S25), the voice that is stored in the voice storage area 615 is recognized by the voice recognition processing (Step S27). The voice recognition can be performed using various known algorithms. The dictionary that is stored in the dictionary storage area 613 is referenced as necessary. In the voice recognition processing, the words that are spoken by the voice are specified. The text data are created that express the words that are specified by the voice recognition processing (Step S29).

The portion that corresponds to the first participant, who is the conference participant who is speaking, is specified from among the captured images in the display image that is created at Step S23 (Step S31). The portion that corresponds to the first participant may be specified by the processing that is described below, for example.

The user ID that was received along with the voice is referenced, as is the terminal ID of the conference terminal that transmitted the communication data that included the voice. The captured image that was received from the conference terminal that transmitted the communication data that included the voice is selected from among the captured images in the display image that is created at Step S23. The file name of the participant image that is associated with the user ID that was received along with the voice is specified in the log-in table 6111. The participant image with the specified file name is selected from the participant image storage area 612 (the selected participant image is called the first participant image).

A determination is made as to whether the selected first participant image is contained in the selected captured image. Specifically, characteristic parts of the face portion of the human image that is contained in the captured image are identified. Any one of various known methods may be used as the method for identifying the characteristic parts of the face portion. For example, an algorithm such as the Harris operator, the scale-invariant feature transform (SIFT), or the like may be used. Characteristic parts of the face portion of the first participant image are also identified. Matching processing is then performed for the characteristic parts that have been identified in the captured image and the characteristic parts that have been identified in the first participant image. In a case where a good match is made, a determination is made that the human image in the captured image that is the basis for the determination is an image of the first participant.

Figure 10:
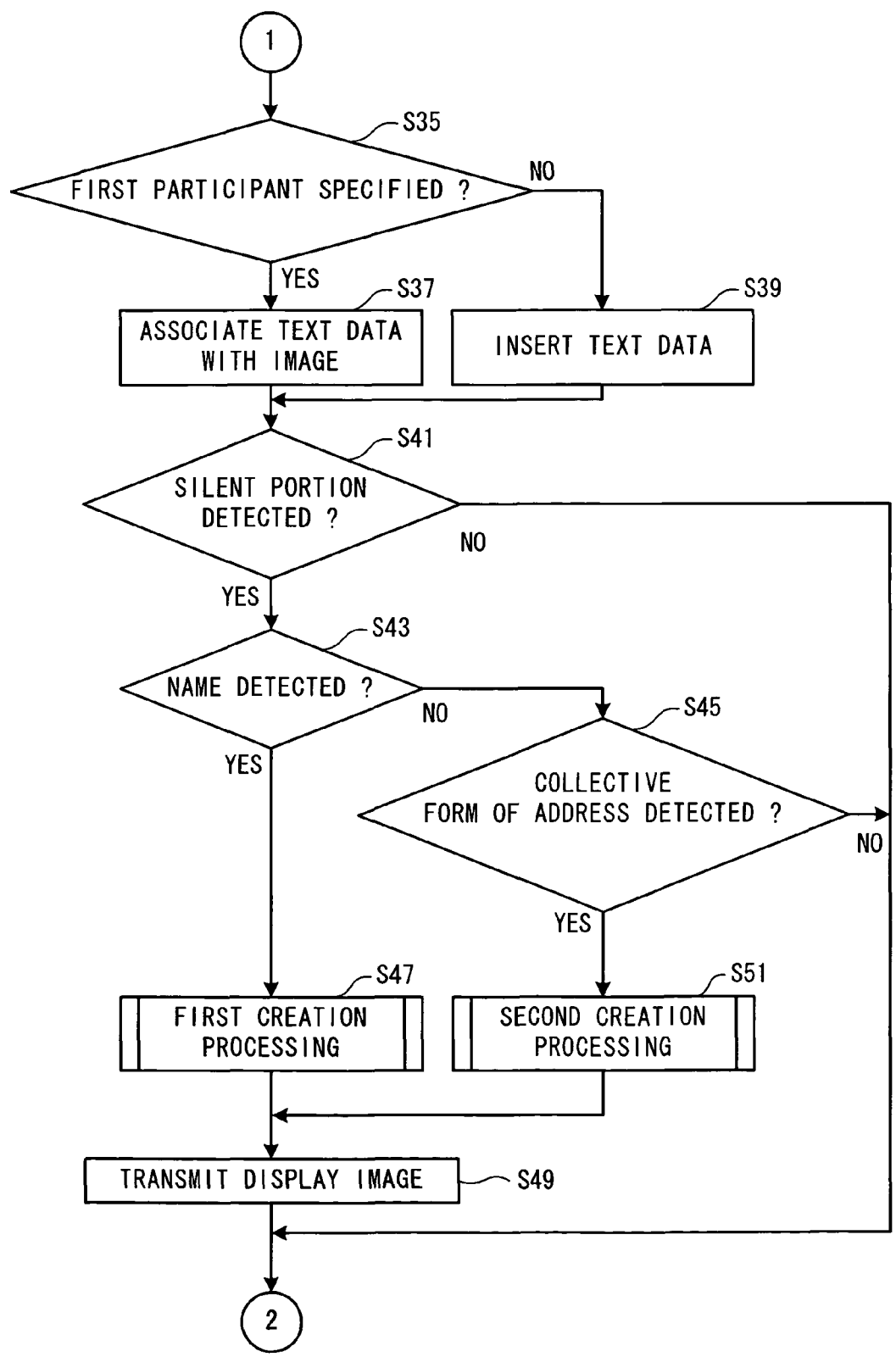
FIG. 10 is a flowchart that shows the image creation processing.

As shown in FIG. 10, in a case where the first participant has been specified (YES at Step S35), the text data that were created at Step S29 (refer to FIG. 9) are associated with the portion that corresponds to the specified human image, among the captured images in the display image that was created at Step S23 (refer to FIG. 9) (Step S37). A display frame (refer to FIG. 17 and the like) is provided that is shaped like a speech balloon that encloses the text data. A projecting portion is also provided on the display frame. The tip of the projecting portion is positioned such that it overlaps the specified human image. The text data are thus associated with the first participant. A display image is created in which the text data are associated with the first participant in the captured image. The processing then proceeds to Step S41.

In a case where the first participant has not been specified (NO at Step S35), the text data that were created at Step S29 (refer to FIG. 9) are inserted into the captured image, among the captured images that configure the display image that was created at Step S23 (refer to FIG. 9), that was received from the conference terminal that transmitted the communication data that include the voice (Step S39). The text data are not associated with an image of a specific conference participant. The processing then proceeds to Step S41.

The present disclosure is not limited to the method that is described above, and other methods can be used. Arrangement information that indicates in what portion of the captured image the first participant, who is speaking, is positioned may also be received from the conference terminal along with the voice. The position with which the text data are associated may also be determined based on the received arrangement information. The text data may also be associated with that position based on the determination.

In the present embodiment, the text data that have been created in the past are stored in the other information storage area 617 in association with the user IDs of the conference participants. In a case where the text data are stored in the other information storage area 617, the stored text data are associated with the portion of the display image that corresponds to the conference participant who is speaking. The text data that are newly created are added to the text data that are stored in the other information storage area 617. Therefore, the conference participants can thus reference histories of what all of the conference participants have said in the past.

A person who is addressed by the voice that is stored in the voice storage area 615 is specified as the second participant, who is another conference participant involved in the conversation, is specified (Step S41 and after).

The voice that is stored in the voice storage area 615 is referenced. A determination is made as to whether there is a portion of the stored voice in which a silent state continues for at least a specified time (for example, two seconds) and whether the word that was spoken immediately prior to the silent state is other than a particle (Step S41). In that case, there is a strong possibility that the words that were spoken immediately prior to the silent state include a word that specifies the second participant.

In a case where there is no portion of the stored voice that satisfies the conditions that are described above (NO at Step S41), the determination is made that the voice is not being directed to a specific other conference participant. The processing returns to Step S13 (refer to FIG. 9). The processing that is described above is then performed again.

In a case where there is a portion of the stored voice that satisfies the conditions that are described above (YES at Step S41), the word that was spoken immediately prior to the silent state is specified. A determination is made as to whether the specified word matches one of the names that are stored in the log-in table 6111 (Step S43). In a case where the specified word matches one of the names (YES at Step S43), the determination is made that the voice in question is directed by the first participant to the other conference participant whose name matches the specified word. The other conference participant is equivalent to the second participant. In a case where the second participant is specified, first creation processing (refer to FIG. 11; described below) is performed (Step S47).

The first creation processing will be explained with reference to FIG. 11. In the first creation processing, the portion is specified that corresponds to the second participant among the captured images in the display image that was created at one of Steps S37 and S39 (refer to FIG. 10). The display frame for the text data is associated with the specified portion. The display image is thus created.

Figure 11:
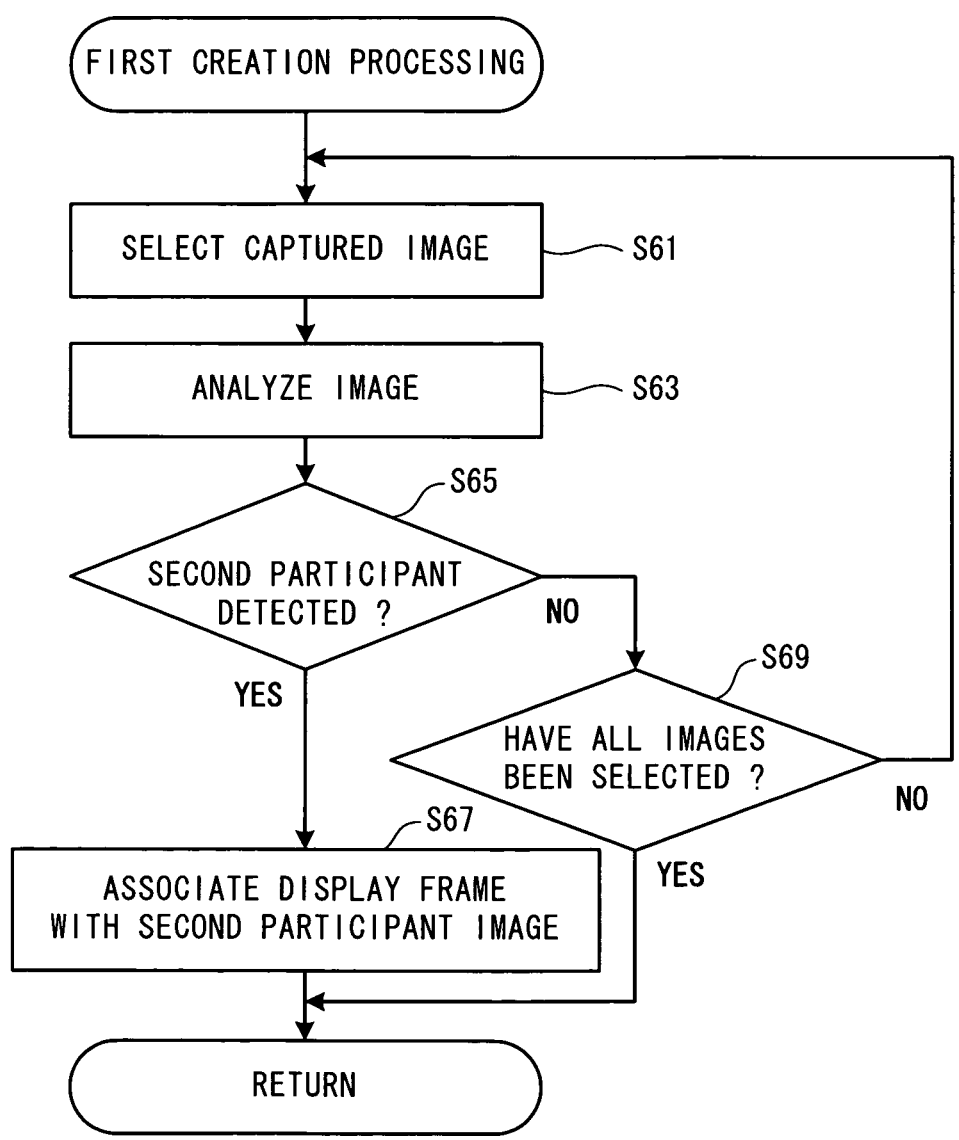
FIG. 11 is a flowchart that shows first creation processing.

As shown in FIG. 11, one of the captured images in the display image that was created by the processing at one of Steps S37 and S39 (refer to FIG. 10) is selected (Step S61). The file name is specified that is associated with the user ID of the second participant whose name was matched in the log-in table 6111 by the processing at Step S43 (refer to FIG. 10). The participant image with the specified file name is acquired from the participant image storage area 612 (the acquired participant image is called the second participant image).

The captured image that was selected by the processing at Step S61 is analyzed (Step S63). The method of analysis can be the same sort of method that was used at Step S31 (refer to FIG. 9), for example. A determination is made as to whether the second participant is included in the captured image (Step S65).

In a case where it is determined that the second participant is included in the captured image (YES at Step S65), a display frame is associated with the human image that corresponds to the second participant (Step S67). The display frame (refer to FIG. 17 and the like), which is shaped like a speech balloon, is positioned close to the portion of the captured image that corresponds to the second participant. The tip of a projecting portion that extends from the display frame is positioned such that it overlaps the portion of the captured image that corresponds to the second participant. The interior of the display frame is tinted a specified color. The text data are not displayed in the display frame. The display frame and the second participant are thus associated with one another. The first creation processing is then terminated, and the processing returns to the image creation processing (refer to FIG. 10).

In a case where it is determined that the second participant is not included in the captured image (NO at Step S65), a determination is made as to whether the processing that is described above has been performed for all of the captured images (Step S69). In a case where a captured image remains for which the processing has not been performed (NO at Step S69), the processing returns to Step S61. One of the unprocessed captured images is selected. The processing that is described above is then performed again. In a case where the processing that is described above has been performed for all of the captured images (YES at Step S69), the first creation processing is terminated, and the processing returns to the image creation processing (refer to FIG. 10).

As shown in FIG. 10, after the first creation processing is terminated, the display image with which the display frame was associated at Step S67 (refer to FIG. 11) is transmitted to the conference terminals 4 to 6 (Step S49). The processing then returns to Step S13 (refer to FIG. 9). The processing that is described above is performed again.

In a case where, at Step S43, the word that was spoken immediately prior to the silent state does not match any of the names that are stored in the log-in table 6111 (NO at Step S43), the determination is made that the word that was spoken immediately prior to the silent state is a word (such as "everyone", for example) that is addressed to other, unspecified persons (Step S45). In this case, it is determined that the first participant is speaking to all of the conference participants. Words that are used to address unspecified persons are stored in advance in the other information storage area 617 of the HDD 61. The word that was spoken immediately prior to the silent state is compared to the words that are stored in the other information storage area 617. In a case where a match is found (YES at Step S45), second creation processing (refer to FIG. 12) is performed (Step S51).

The second creation processing will be explained with reference to FIG. 12. In the second creation processing, all of the conference participants are specified who are included in the captured images that configure the display image that was created at one of Steps S37 and S39 (refer to FIG. 10). The display frame for the text data is associated with the conference participants. The display image is thus created.

Figure 12:
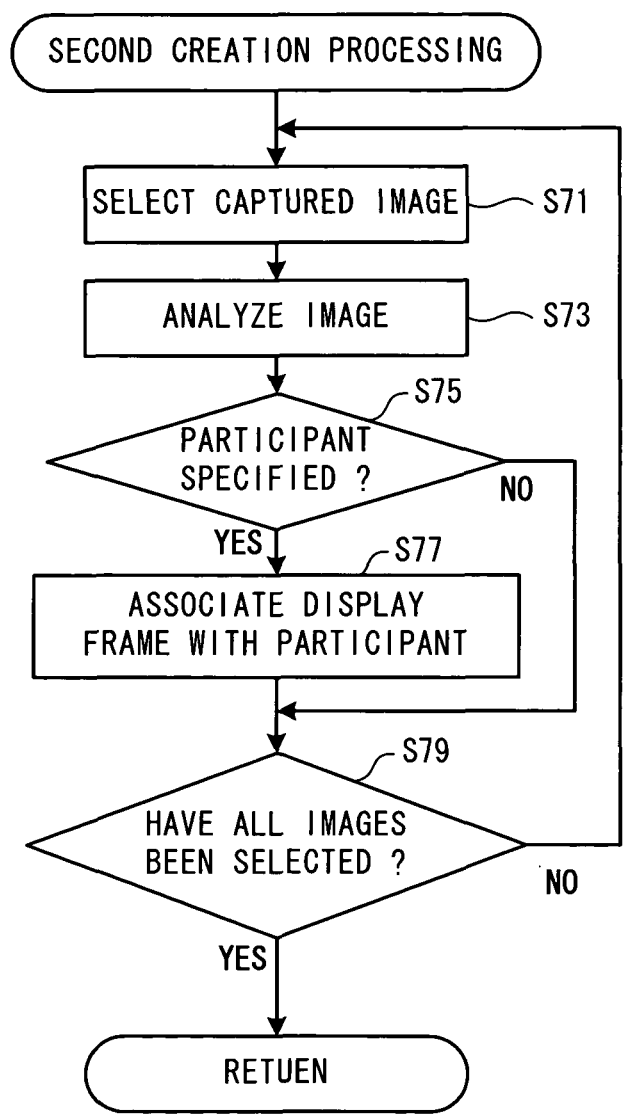
FIG. 12 is a flowchart that shows second creation processing.

As shown in FIG. 12, one of the captured images in the display image that was created by the processing at one of Steps S37 and S39 (refer to FIG. 10) is selected (Step S71). The selected image is analyzed. A determination is made as to whether a human image is included in the selected captured image (Step S73). Any one of various known methods may be used as the method for determining whether a human image is included. For example, the method described below can be used. Parameters that indicate characteristic points (shape, face color, eyes, nose, and the like) of an ordinary human image are stored in advance in the other information storage area 617 of the HDD 61. Characteristic points are identified within the captured image. An algorithm such as the previously described Harris operator, the SIFT, or the like may be used as the method for identifying the characteristic points. The characteristic points that are identified in the captured image are compared to the characteristic points that are stored in the other information storage area 617. In a case where a good match is made, a determination is made that the image of the portion of the captured image in which the characteristic points were identified is a human image. The image for which the determination is made corresponds to the conference participant who is included in the captured image.

In a case where the image of the conference participant who is included in the captured image is specified (YES at Step S75), a display frame in which the text data are displayed is associated with the specified image of the conference participant (Step S77). The details of the display frame and the method by which it is associated with the specified image are the same as for the display frame at Step S67 (refer to FIG. 11). The processing then proceeds to Step S79. In a case where the image of the conference participant is not included in the captured image (NO at Step S75), the processing proceeds to Step S79.

At Step S79, a determination is made as to whether the processing that is described above has been performed for all of the captured images that configure the display image that was created at one of Steps S37 and S39 (refer to FIG. 10) (Step S79). In a case where a captured image remains for which the processing has not been performed (NO at Step S79), the processing returns to Step S71. One of the unprocessed captured images is selected. The processing that is described above is then performed again. In a case where the processing that is described above has been performed for all of the captured images (YES at Step S79), the second creation processing is terminated, and the processing returns to the image creation processing (refer to FIG. 10).

After the second creation processing is terminated, the display image with which the display frame was associated at Step S77 (refer to FIG. 12) is transmitted to the conference terminals 4 to 6 (Step S49). The processing then returns to Step S13 (refer to FIG. 9). The processing that is described above is performed again.

Figure 13:
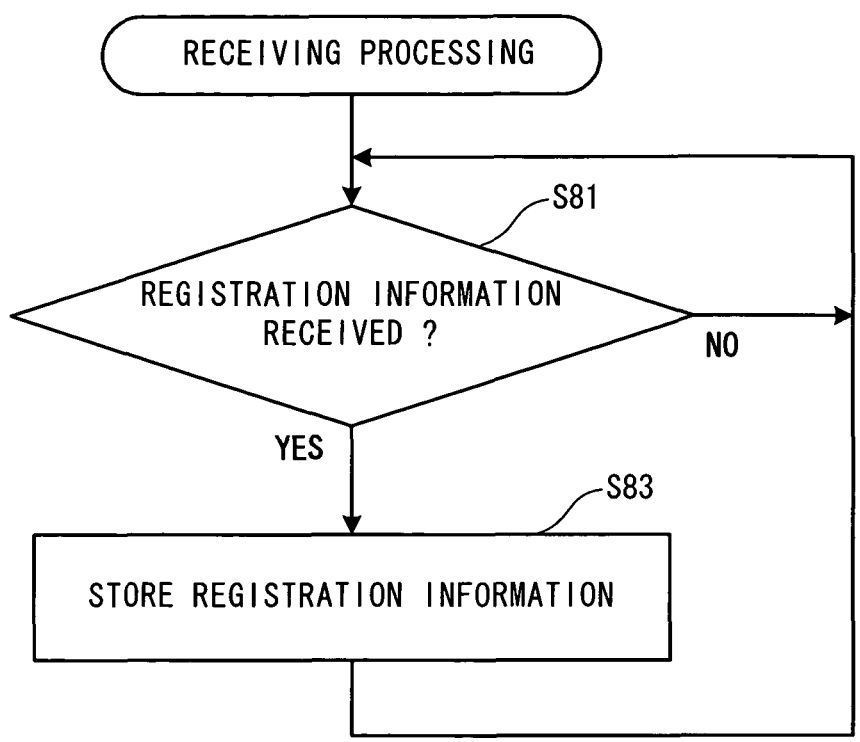
FIG. 13 is a flowchart that shows receiving processing.

The receiving processing will be explained with reference to FIG. 13. In the receiving processing, in a case where the registration information has been received from the conference terminals 4 to 6, the registration information is stored in the log-in table 6111 and the participant image storage area 612. As shown in FIG. 13, in the receiving processing, a determination is made as to whether the registration information has been received from the conference terminals 4 to 6 (Step S81). In a case where the registration information has not been received (NO at Step S81), the processing returns to Step S81. The receiving of the registration information is monitored.

In a case where the registration information has been received (YES at Step S81), various types of information that are included in the registration information are stored in the log-in table 6111 and the participant image storage area 612 (Step S83). Specifically, the user IDs, the terminal IDs, the names, and the file names for the participant images that are included in the registration information are stored as the user IDs, the terminal IDs, the names, and the file names in the log-in table 6111. The participant images are stored in the participant image storage area 612. The processing returns to Step S81. The processing that is described above is performed again.

Log-in processing that is performed by the CPU 20 of the conference terminal 4 will be explained with reference to FIGS. 14 to 16. The log-in processing is performed in a case where a user logs into the video conference. After the user has logged in, the captured image and the voice are transmitted to the MCU 3. The captured image is captured by the camera 34. The voice is input through the microphone 35. The display image that is received from the MCU 3 is displayed on the display 28. The log-in processing is performed by the CPU 20 when the power supply to the conference terminal 4 is turned on.

Figure 14:
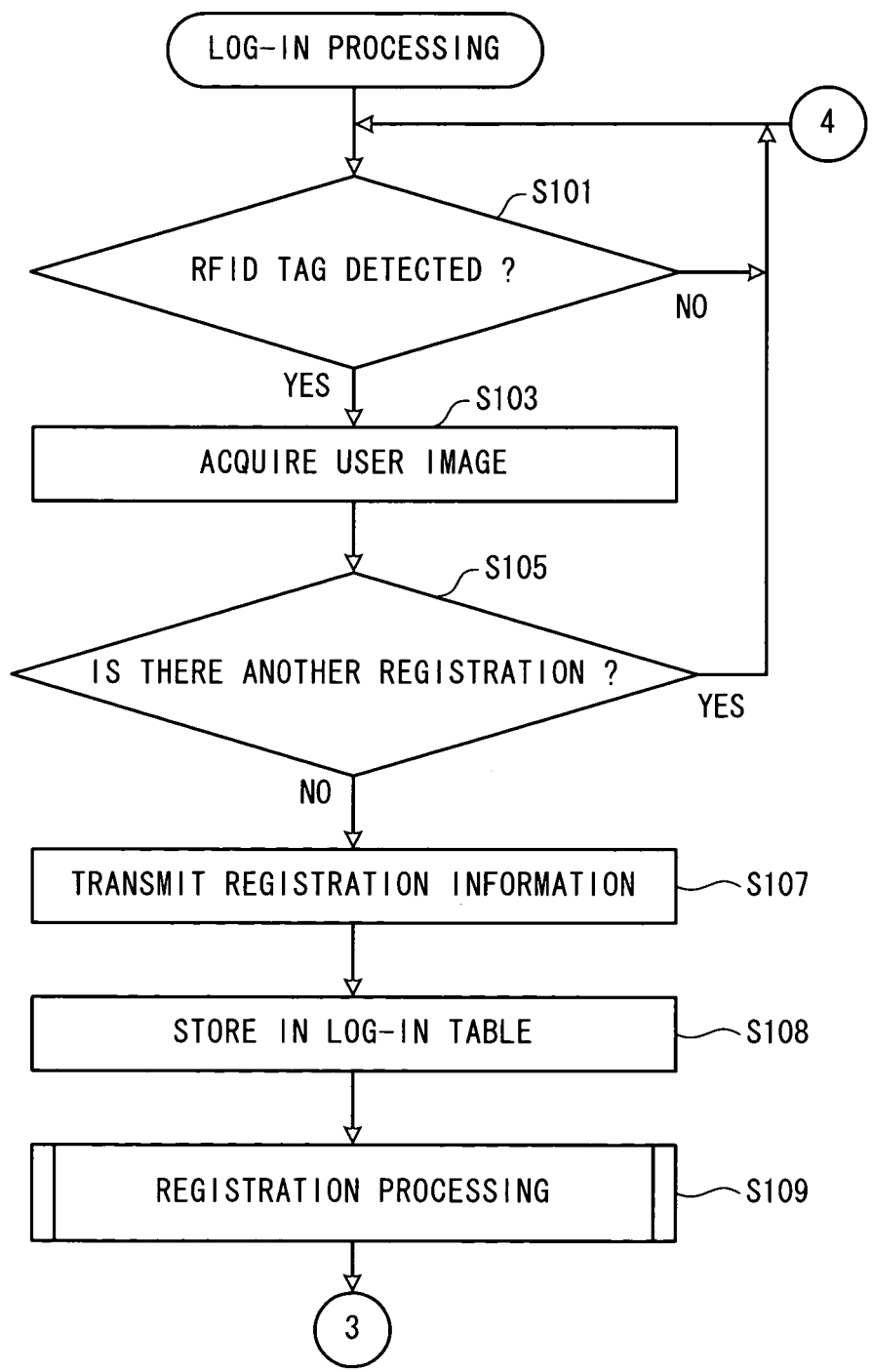
FIG. 14 is a flowchart that shows log-in processing.

As shown in FIG. 14, in the log-in processing, a determination is made as to whether an RFID tag has been detected through the RFID reader 36 (Step S101). In a case where an RFID tag has not been detected (NO at Step S101), the processing returns to Step S101. Monitoring for an RFID tag continues to be performed.

A person who wishes to participate in the video conference places an RFID tag he possesses in contact with the RFID reader 36. The RFID tag is detected by the RFID reader 36. In a case where an RFID tag has been detected (YES at Step S101), the user ID that is stored in the RFID tag is read. The user information table 3121 is referenced. The file name is specified that is associated with the user ID that has been read. The user image with the specified file name is acquired from the user image storage area 313 (Step S103).

In a case where a plurality of users log into the video conference from the conference terminal 4 at the same time, the plurality of users place their RFID tags in contact with the RFID reader 36 sequentially. In a case where an operation to continue the log-in operation is performed through the keyboard 29 (YES at Step S105), the processing returns to Step S101. Monitoring for an RFID tag continues to be performed. In a case where an operation to end the log-in operation is performed through the keyboard 29 (NO at Step S105), the processing proceeds to Step S107.

At Step S107, the user information table 3121 is referenced. The names that are associated with the user IDs that have been read from the RFID tags are specified. The user IDs that have been read from the RFID tags, the specified names, and the user images that were acquired at Step S103 are transmitted as the registration information to the MCU 3, along with the terminal ID of the conference terminal 4 (Step S107). The user IDs, the names and the file names for the user images are stored in the log-in table 3111 (Step S108). The users who performed the log-in operation by placing their RFID tags in contact with the RFID reader 36 are able to participate in the video conference.

Registration processing (refer to FIG. 16) is performed (Step S109). The registration processing recognizes the portions of the captured images in which the users who have performed the log-in operation and are able to participate in the video conference, that is, the conference participants, are located.

The registration processing will be explained with reference to FIG. 16. In the registration processing, one of the names that are stored in the log-in table 3111 are referenced in order. Voice synthesis is used to convert the referenced names into voice form. Voice forms of expressions for addressing the conference participants with the referenced names (for example, "Mr. _____, please respond," and the like) are added to the voice forms of the names. One of the voice forms that are thus created (called the addressing voice forms) is output from the speaker 37 (Step S131).

The speaking voice of the conference participant who speaks in response to the addressing voice form (for example, "Mr. AAAA, please respond," or the like) is monitored. At the same time, images of the conference participants are captured by the camera 34. In a case where the speaking voice of one of the conference participants is detected through the microphone 35 (YES at Step S133), the captured image of the conference participant that was captured at the time that the speaking voice was detected is subjected to image analysis. The conference participant who is speaking is specified from among the conference participants who are included in the captured image. Coordinate information that indicates the position of the portion of the captured image that corresponds to the specified conference participant is stored as the arrangement information in the log-in table 3111 (Step S135). The processing proceeds to Step S137. In a case where the speaking voice of one of the conference participants is not detected (NO at Step S133), the processing proceeds to Step S137.

The specifying of the image of the portion that corresponds to the conference participant who is speaking in response to the addressing voice form may be done by the method that is described below, for example. In a case where a speaking voice is detected that is responding to the addressing voice form, the captured image that was captured at the time that the voice was detected is referenced. A characteristic portion for a mouth is identified in the human image that is included in the referenced captured image. Any one of various known methods (the Harris operator, the SIFT, or the like) may be used as the method for identifying the characteristic portion. In a case where there is a plurality of the conference participants, a plurality of characteristic portions for mouths are identified. Movements of the characteristic portions for the mouths are recognized. In a case where the extent of a recognized movement is large, the person whose mouth is making the movement is specified as the conference participant who is speaking in response to the addressing voice form. Coordinate information for the portion of the captured image that corresponds to the specified conference participant (for example, coordinate information for the mouth) is specified.

In the processing at Step S137, a determination is made as to whether the addressing voice form has been output to all of the conference participants whose user IDs are stored in the log-in table 3111 (Step S137). In a case where a conference participant remains who has not been addressed (YES at Step S137), the processing returns to Step S131. The processing that is described above is performed again for each of the remaining conference participants. In a case where the addressing voice form has been output to all of the conference participants (NO at Step S137), the registration processing is terminated. The processing returns to the log-in processing (refer to FIG. 14).

The method for specifying the portion that corresponds to the conference participant who is speaking in response to the addressing voice form is not limited to the method that is described above. Another method may also be used. For example, the specifying may also be done by the method that is described below. In a case where the registration processing has been started, an image of the conference participants that has been captured by the camera 34 is displayed on the display 28. Specified voice forms (for example, "Mr. _____, please click on your own image," and the like) is added to the voice forms of the names that have been created by the voice synthesis. The addressing voice form for addressing one of the conference participants (for example, "Mr. AAAA, please click on your own image," or the like) is output from the speaker 37. The conference participant who is addressed operates the mouse 27. A specified portion within the image is selected by the mouse 27. The coordinates of the portion that is selected by the mouse 27 are specified as the coordinate information for the portion of the captured image that corresponds to the conference participant who was addressed. The specified coordinate information is stored as the arrangement information in the log-in table 3111.

The specifying of the portion that corresponds to the conference participant may also be done by the method that is described below, for example. A highly directional microphone that is able to specify the direction from which the voice is coming is used for the microphone 35. A specified addressing voice form (for example, "Mr. AAAA, please respond," or the like) is output from the speaker 37. The person who is addressed speaks in response to the addressing voice form. In a case where the speaking voice is detected, the direction from which the detected voice is coming is specified by the microphone 35. Coordinate information that indicates the specified direction is specified as the coordinate information for the portion of the captured image that corresponds to the conference participant who was addressed. The specified coordinate information is stored as the arrangement information in the log-in table 3111.

Figure 15:
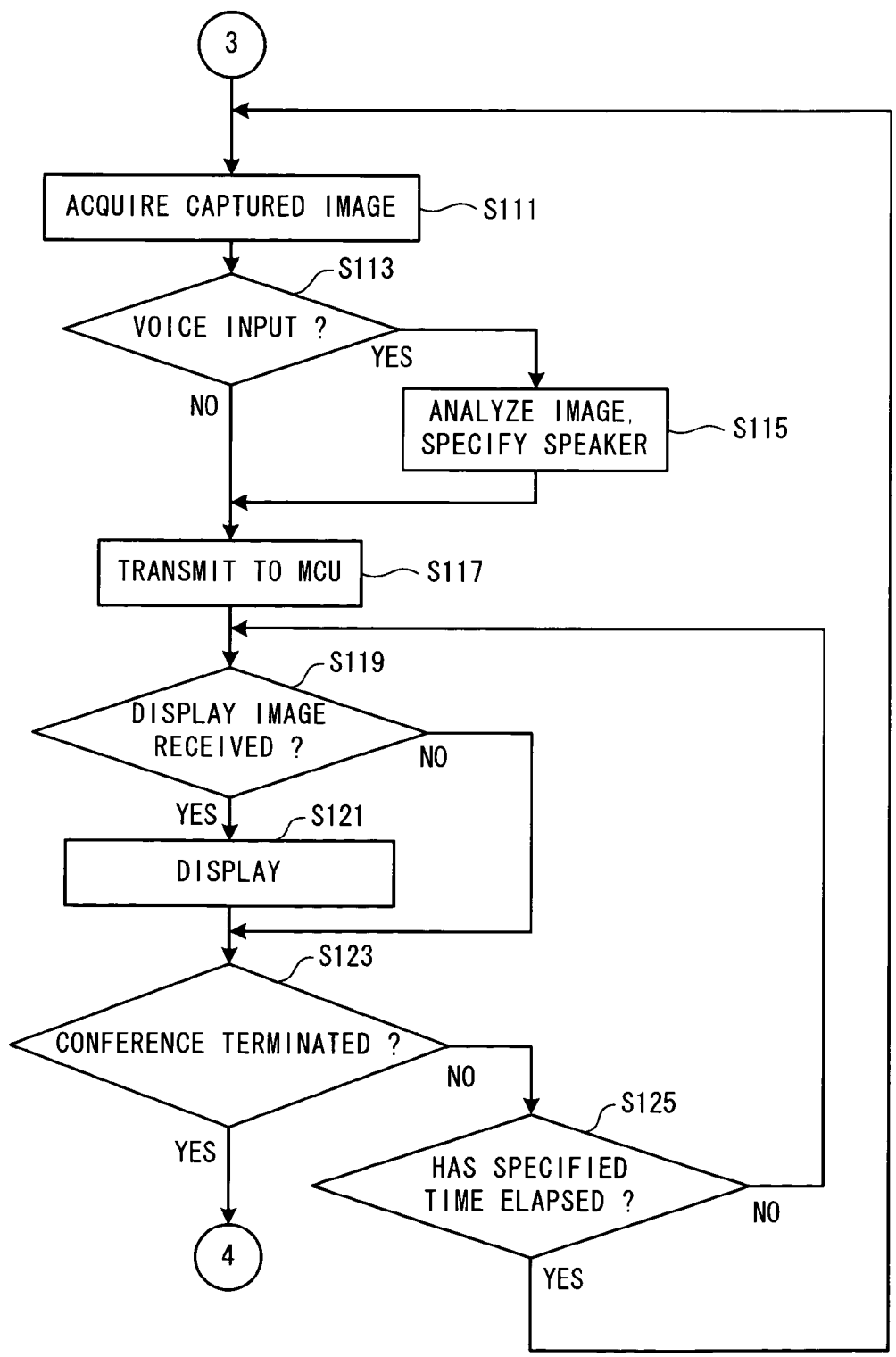
FIG. 15 is a flowchart that shows the log-in processing.
Figure 16:
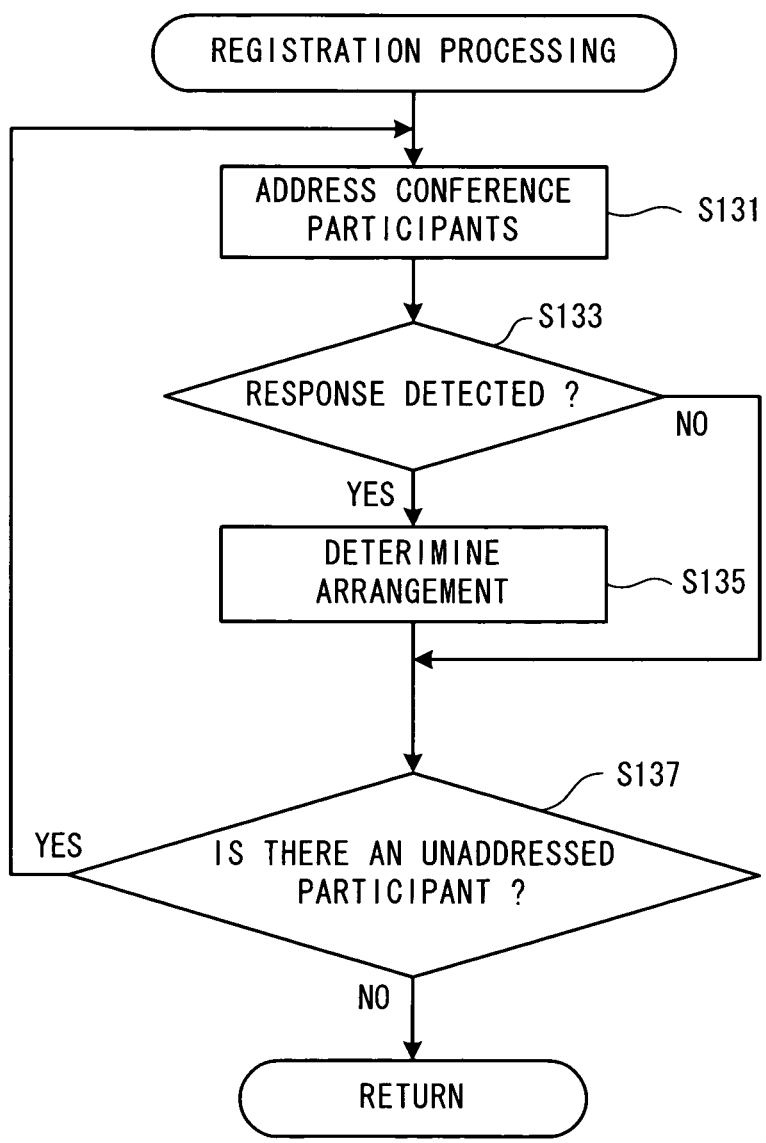
FIG. 16 is a flowchart that shows registration processing.

As shown in FIG. 15, when the registration processing is terminated, the captured image that was captured by the camera 34 is acquired (Step S111). The acquired captured image is stored in the captured image storage area 314. Monitoring is conducted for a voice that is input through the microphone 35. In a case where a voice is not input through the microphone 35 (NO at Step S113), the processing proceeds to Step S117. In a case where a voice is input through the microphone 35 (YES at Step S113), the voice that is input is acquired. The acquired voice is stored in the voice storage area 315. The speaking voice of the first participant is specified based on the captured image that was captured at the time when the voice was acquired (Step S115). The processing proceeds to Step S117.

The specifying of the first participant may be performed by the method that is described below, for example. The captured image that was captured at the time when the voice was acquired is referenced.

A characteristic portion for a mouth is identified in the human images that are included in the referenced captured image. A movement of the identified characteristic portion for the mouth is recognized. In a case where the extent of the recognized movement is large, coordinate information is specified that indicates the position of the mouth portion. The arrangement information in the log-in table 3111 is referenced. The arrangement information that is closest to the coordinate information for the mouth portion is selected from among the arrangement information in the log-in table 3111. The user ID that is associated with the selected arrangement information is specified as the user ID of the first participant, who is speaking. The specified user ID is associated with the voice that was input and is stored in the voice storage area 315.

Note that the present invention is not limited to the method for specifying the first participant that is described above. For example, the first participant may also be specified using a known speaker recognition technology.

In the processing at Step S117, communication data that include the captured image that is stored in the captured image storage area 314 are transmitted to the MCU 3. In a case where a voice is stored in the voice storage area 315, communication data that include the stored voice and the user ID of the first participant, who is speaking, are transmitted to the MCU 3 (Step S117).

A determination is made as to whether the display image that was created and transmitted by the MCU 3 has been received (Step S119). In a case where the display image has been received (YES at Step S119), the received display image is displayed on the display 28 (Step S121). In a case where a voice has been received, the received voice is output from the speaker 37. The processing then proceeds to Step S123. In a case where the display image has not been received (NO at Step S119), the processing for displaying on the display 28 is not performed. The processing then proceeds to Step S123.

In the processing at Step S123, a determination is made as to whether an operation that terminates the video conference has been performed by one of the conference participants through one of the keyboard 29 and the mouse 27 (Step S123). In a case where an operation that terminates the video conference has been performed (YES at Step S123), processing is performed that is necessary in order to log out from the video conference (notification to the MCU 3 and the like). The log-in processing is then terminated.

In a case where an operation that terminates the video conference has not been performed (NO at Step S123), a determination is made as to whether a specified period of time (for example, 1 millisecond) has elapsed since the captured image and the voice were transmitted to the MCU 3 (Step S125). In a case where the specified period of time has not elapsed (NO at Step S125), the processing returns to Step S119. The receiving of the display image is monitored. The display image is displayed. The monitoring of the operation that terms the video conference is performed. In a case where the specified period of time has elapsed (YES at Step S125), the processing returns to Step S111. Thus the captured image and the voice are transmitted to the MCU 3 on a specified cycle.

Figure 17:
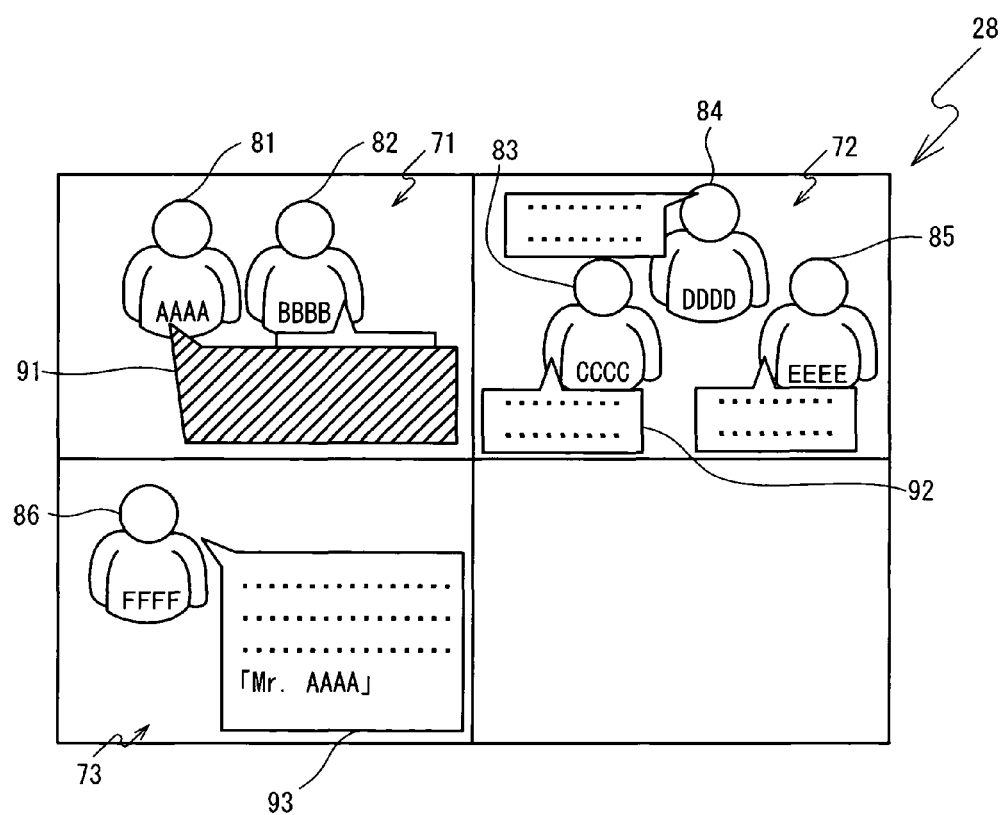
FIG. 17 is a figure that shows an example of a display screen that is displayed on a display.

An example of the display image that is displayed on the displays 28 of the conference terminals 4 to 6 as a result of the processing at Step S121 (refer to FIG. 15) will be explained with reference to FIGS. 17 and 18. In FIG. 17, an example is shown of the display image that is displayed on the display 28 of the conference terminal 4. Mr. AAAA 81 and Mr. BBBB 82 (who are using the conference terminal 4), Mr. CCCC 83, Mr. DDDD 84, and Mr. EEEE 85 (who are using the conference terminal 5), and Mr. FFFF 86 (who is using the conference terminal 6) are logged into the video conference. The display area is divided into four areas, and a captured image 71 that was captured by the conference terminal 4 is displayed in the upper left area. A captured image 72 that was captured by the conference terminal 5 is displayed in the upper right area. A captured image 73 that was captured by the conference terminal 6 is displayed in the lower left area.

Text data (92, 93, and the like) that express the words that the conference participants who are speaking are saying are associated with the corresponding conference participants in the display image. The text data 93, which say, " . . . , Mr. AAAA," are associated with Mr. FFFF 86, who is included in the captured image 73 that was captured by the conference terminal 6. The text data 93 indicate that Mr. FFFF 86 is speaking to Mr. AAAA 81. Mr. FFFF 86 is equivalent to the first participant.

A display frame 91 that is tinted a specified color is associated with the image of Mr. AAAA 81 that is included in the captured image 71 that was captured by the conference terminal 4. The display frame 91 indicates that one of the conference participants is speaking to Mr. AAAA 81. Mr. AAAA 81 is equivalent to the second participant.

The conference participants refer to the text data (92, 93, and the like) that are associated with the images of the conference participants. The conference participants can thus reference a history of what has been said in the past. The specified display frame 91 is associated with the image of the second participant (Mr. AAAA 81). The conference participants can easily determine that the voice that is being output from the speakers 37 is speaking to Mr. AAAA 81.

Figure 18:
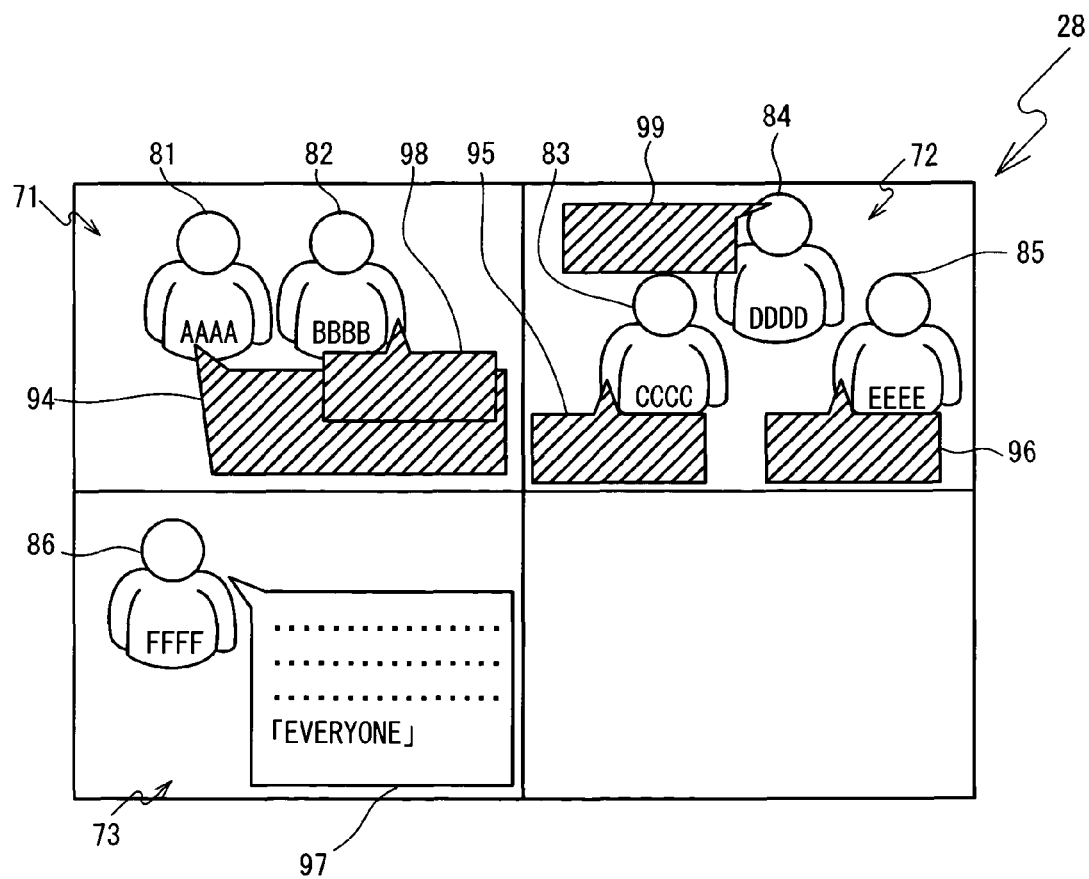
FIG. 18 is a figure that shows an example of a display screen that is displayed on the display.

In FIG. 18, text data 97, which says, " . . . , everyone," is associated with Mr. FFFF 86, who is included in the captured image 73 that was captured by the conference terminal 6. The text data 97 indicate that Mr. FFFF 86 is speaking to all of the other conference participants.

Display frames 94, 95, 96, 98, 99 that are tinted a specified color are associated with the images of all of the other conference participants who are participating in the video conference (Mr. AAAA 81, Mr. BBBB 82, Mr. CCCC 83, Mr. DDDD 84, Mr. EEEE 85). The display frames indicate that Mr. FFFF 86 is speaking to all of the conference participants except Mr. FFFF 86. Each of the conference participants except Mr. FFFF 86 is equivalent to the second participant.

As described above, in a case where the voice of one specified conference participant (Mr. FFFF 86) is speaking to all of the other conference participants, the display frames (94, 95, 96, and the like) are associated with the other conference participants (Mr. AAAA 81, Mr. BBBB 82, Mr. CCCC 83, Mr. DDDD 84, Mr. EEEE 85). It can thus be easily determined that the voice that is output from Mr. FFFF 86 is speaking to all of the other conference participants.

As explained previously, the MCU 3 uses voice recognition to convert what the conference participants say into the text data. The MCU 3 associates the text data with the image of the conference participant who is speaking. The MCU 3 associates the display frame for the text data with the image of the other conference participant (the second participant) in the conversation. The display image that includes the associated text data is transmitted to the conference terminals 4 to 6. The display image is displayed on the displays 28 of the conference terminals 4 to 6. The conference participants can determine who is speaking and associate the speaker with a history of what has been said. The conference participants can easily determine who is being addressed in the conversation.

The present disclosure is not limited to what has been described above, and various modifications are possible. In the explanation above, the tinted display frame is associated with the image of the second participant. The conference participants thus determine who the other conference participant in the conversation is. The present disclosure is not limited to this method. A modified example of the present disclosure will be explained below.

The first creation processing in the modified example of the present disclosure will be explained with reference to FIG. 19. In the first creation processing, the text data are associated with the image of the first participant. The image of the second participant is associated with the image of the first participant. The display image is thus created. The configuration of the video conference system 1, the electrical configurations, the receiving processing, the image creation processing other than the first creation processing, and the log-in processing are the same as described previously. Explanations of these elements will be omitted below.

Figure 19:
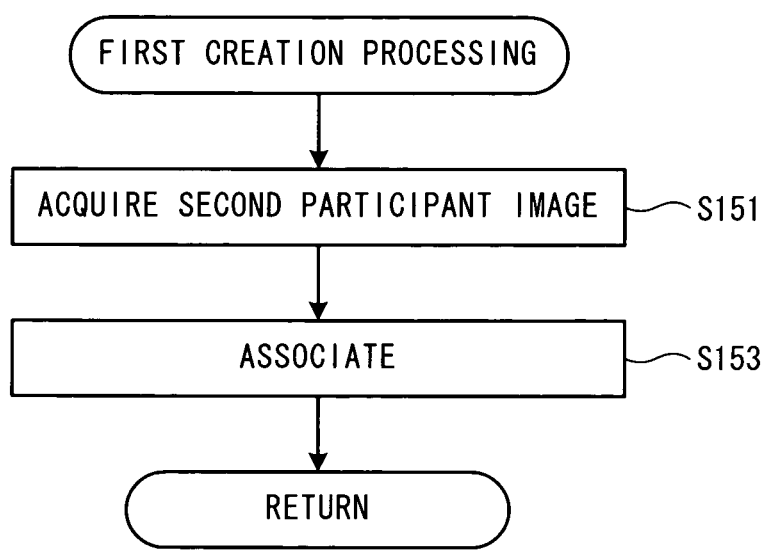
FIG. 19 is a flowchart that shows first creation processing in a modified example.

In the first creation processing in the modified example, as shown in FIG. 19, the log-in table 6111 (refer to FIG. 4) is referenced. The file name is specified that is associated with the user ID of the second participant who was specified at Step S43 (refer to FIG. 10). The image of the second participant, which is the participant image with the specified file name, is acquired from the participant image storage area 612 (Step S151).

The acquired image of the second participant is associated with the image of the first participant that was created in the processing at one of Steps S37 and S39 (refer to FIG. 10) (Step S153). The image of the second participant is arranged in a margin of a display frame that is associated with the image of the first participant. The image of the second participant is thus associated with the image of the first participant. The size of the image of the second participant is modified appropriately such that the image of the second participant fits within a margin of a display frame. The first creation processing is terminated, and the processing returns to the image creation processing (refer to FIG. 10).

Figure 20:
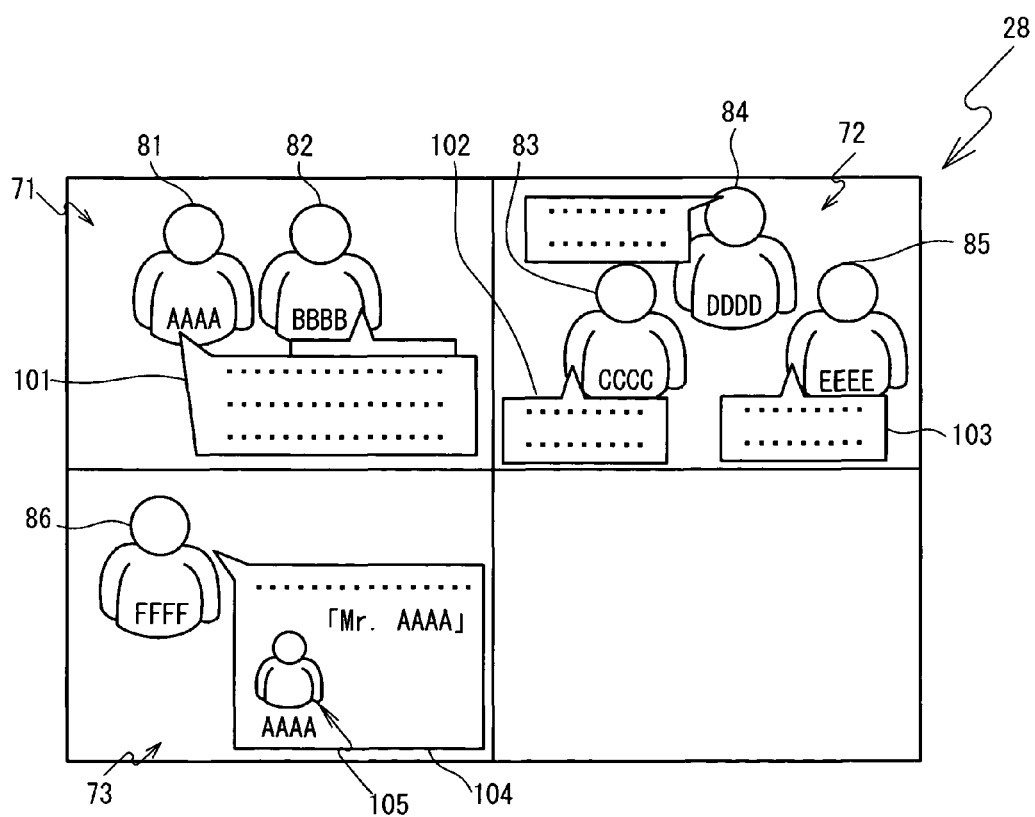
FIG. 20 is a figure that shows an example of a display screen that is displayed on the display in the modified example.

An example of the display image that is displayed on the display 28 of the conference terminal 4 will be explained with reference to FIG. 20. As shown in FIG. 20, text data (101, 102, 103, and the like) that express the words that the conference participants are saying are associated with the images of the corresponding conference participants in the display image. The text data 104, which say, " . . . , Mr. AAAA," are associated with Mr. FFFF 86, who is included in the captured image 73 that was captured by the conference terminal 6. The text data 104 indicate that Mr. FFFF 86 is speaking to Mr. AAAA 81 (the second participant). Mr. FFFF 86 is equivalent to the first participant.

A participant image 105 of Mr. AAAA 81 is inserted into the margin of the display frame for the text data 104. The participant image 105 indicates that the text data 104 express the words that are being spoken to Mr. AAAA 81. The second participant is equivalent to Mr. AAAA 81.

As explained above, in the modified example, the image of the second participant is associated with the image of the first participant. The conference participants visually recognize the image of the second participant that is associated with the image of the first participant. This makes it possible for the conference participants to easily recognize the conference participant to whom the voice that is represented by the text data is addressed.

In the explanation above, the second participant can be specified by associating the display frame for the text data with the image of the second participant. The present disclosure is not limited to this method. Another display element (an arrow or the like) may also be associated with the second participant, as long as the second participant can be specified.

In the explanation above, the display frame that is associated with the image of the second participant does not contain the text data. The present disclosure is not limited to this configuration. The display frame that is associated with the image of the second participant may also contain the text data. In the explanation above, the display frame that is associated with the image of the second participant is tinted a specified color. The present disclosure is not limited to this configuration. The display frame may also be displayed with a bold outline, such that it can be distinguished from another display frame.

In the explanation above, the first participant and the second participant can be easily specified by the associating of the image of the second participant with the image of the first participant. The present disclosure is not limited to this method. A captured image in which the second participant is visible may also be associated with the image of the first participant. In a case where a plurality of the conference participants are the second participant is visible in a plurality of the captured images, the second participant may also be specified by analyzing the captured images. A display for identifying the specified second participant (an arrow, a line surrounding the second participant, or the like) may also be associated with the image of the second participant. The second participant may thus be specified within the captured image. This method demonstrates the same sort of effect as in the case where the image of the second participant is directly associated with the image of the first participant.

While the invention has been described in connection with various exemplary structures and illustrative embodiments, it will be understood by those skilled in the art that other variations and modifications of the structures and embodiments described above may be made without departing from the scope of the invention. Other structures and embodiments will be apparent to those skilled in the art from a consideration of the specification or practice of the invention disclosed herein. It is intended that the specification and the described examples are illustrative with the true scope of the invention being defined by the following claims.

What is claimed is:

1. A conference support device that, by controlling communication among a plurality of conference terminals, is configured to support a video conference that is conducted among conference participants who are using the conference terminals, the conference support device comprising:
    a memory configured to store computer-readable instructions; and
    a processor that is configured to execute the computer-readable instructions to:
        receive, from the plurality of the conference terminals, captured images that are captured by image capture devices of the conference terminals and in each of which at least one of the conference participants is visible;
        receive, from a first conference terminal that is one of the plurality of the conference terminals, a voice that is generated by a first participant, the first participant being one of the conference participants and being using the first conference terminal, the voice being input from a voice input device of the first conference terminal;
        identify words that are included in the received voice by voice recognition processing;
        create text data that express the identified words;
        specify a second participant who is a different conference participant from the first participant based on a result of the voice recognition processing, the second participant corresponding to the identified words and being at least one of the conference participants;
        create a display image that is to be displayed on display devices of the plurality of the conference terminals from the captured images, and in which the text data are associated with a first portion of the captured image that corresponds to the first participant and a specified image is associated with a second portion of the captured image that corresponds to the second participant, the specified image being an image that indicate that the second participant is addressed by the first participant; and
        transmit the created display image to the plurality of the conference terminals, in order for the display image to be displayed on the display devices of the plurality of the conference terminals.

2. The conference support device according to claim 1, wherein
    the specified image is a blank display frame in which text will be displayed, and
    the creating the display image includes creating the display image by associating the blank display frame with the second portion of the captured image that corresponds to the second participant.

3. The conference support device according to claim 1, wherein
the specifying the second participant includes, in a case where the identified words by the voice recognition processing include a first specified word, specifying all of the conference participants except the first participant as the second participant, and
the creating the display image includes, in a case where all of the conference participants except the first participant are specified as the second participant, creating the display image by associating the specified image with the second portion of the captured image that correspond to the second participant.

4. The conference support device according to claim 1, wherein
the receiving the voice includes receiving, along with the voice that is generated by the first participant, information that specifies the first participant; and
the creating the display image includes specifying the first portion of the captured image that corresponds to the first participant, based on a participant image that is associated with the information that specifies the first participant, among participant images that are stored in a storage portion, the participant images being images of the conference participants and being associated with information that specifies the conference participants, respectively, and associating the text data with the specified first portion of the captured image.

5. The conference support device according to claim 1, wherein
the processor is further configured to execute the computer-readable instructions to:
select, as a second participant image, from among participant images that are stored in a storage portion, one of the participant images that is associated with information that specifies the second participant, the participant images being images of the conference participants and being associated with information that specifies the conference participants, respectively,
wherein
the creating the display image includes:
associating the text data with the first portion of the captured image that corresponds to the first participant, and
associating the selected second participant image, as the specified image, with the first portion of the captured image that corresponds to the first participant.

6. The conference support device according to claim 5, wherein
the receiving the voice includes receiving, along with the voice that is generated by the first participant, information that specifies the first participant, and
the creating the display image includes:
specifying the first portion of the captured image that corresponds to the first participant, based on one of the participant images that is associated with the information that specifies the first participant, among the participant images that are stored in the storage portion, and
associating the text data and the selected second participant image with the specified first portion of the captured image.

7. The conference support device according to claim 1, wherein
the specifying the second participant includes:
determining whether a silent state has been continued for a specified time immediately after a second specified word was spoken, and
specifying, in a case where the silent state has been continued for the specified time, the second participant based on the second specified word.

8. A conference support method that, by controlling communication among a plurality of conference terminals, is configured to support a video conference that is conducted among conference participants who are using the conference terminals, the conference support method comprising:
receiving, from the plurality of the conference terminals, captured images that are captured by image capture devices of the conference terminals and in each of which at least one of the conference participants is visible;
receiving, from a first conference terminal that is one of the plurality of the conference terminals, a voice that is generated by a first participant, the first participant being one of the conference participants and being using the first conference terminal, the voice being input from a voice input device of the first conference terminal;
identifying words that are included in the received voice by voice recognition processing;
creating text data that express the identified words;
specifying a second participant who is a different conference participant from the first participant based on a result of voice recognition processing, the second participant corresponding to the identified words and being at least one of the conference participants;
creating a display image that is to be displayed on display devices of the plurality of the conference terminals from the captured images that have been received, and in which the text data that have been created are associated with a first portion of the captured image that corresponds to the first participant and a specified image is associated with a second portion of the captured image that corresponds to the second participant, the specified image being an image that indicates that the second participant is addressed by the first participant; and
transmitting the created display image to the plurality of the conference terminals, in order for the display image to be displayed on the display devices of the plurality of the conference terminals.

9. The conference support method according to claim 8, wherein
the specified image is a blank display frame in which text will be displayed, and
the creating the display image includes creating the display image by associating the blank display frame with the second portion of the captured image that corresponds to the second participant.

10. The conference support method according to claim 8, wherein
the specifying the second participant includes, in a case where the identified words by the voice recognition processing include a first specified word, specifying all of the conference participants except the first participant as the second participant, and
the creating the display image includes, in a case where all of the conference participants except the first participant are specified as the second participant, creating the display image by associating the specified image with the second portion of the captured image that correspond to the second participant.

11. The conference support method according to claim 8, wherein
the receiving the voice includes receiving, along with the voice that is generated by the first participant, information that specifies the first participant; and the creating the display image includes:
specifying the first portion of the captured image that corresponds to the first participant, based on a participant image that is associated with the information that specifies the first participant, among participant images that are stored in a storage portion, the participant images being images of the conference participants and being associated with information that specifies the conference participants, respectively, and
associating the text data with the specified first portion of the captured image.

12. The conference support method according to claim 8, further comprising:
selecting, as a second participant image, from among participant images that are stored in a storage portion, one of the participant images that is associated with information that specifies the second participant, the participant images being images of the conference participants and being associated with information that specifies the conference participants, respectively,
wherein the creating the display image includes:
associating the text data with the first portion of the captured image that corresponds to the first participant, and
associating the selected second participant image, as the specified image, with the first portion of the captured image that corresponds to the first participant.

13. The conference support method according to claim 12, wherein
the receiving the voice includes receiving, along with the voice that is generated by the first participant, information that specifies the first participant, and
the creating the display image includes:
specifying the first portion of the captured image that corresponds to the first participant, based on one of the participant images that is associated with the information that specifies the first participant, among the participant images that are stored in the storage portion, and
associating the text data and the selected second participant image with the specified first portion of the captured image.

14. A non-transitory computer-readable medium that stores a conference support program for a conference support device that, by controlling communication among a plurality of conference terminals, is configured to support a video conference that is conducted among conference participants who are using the conference terminals, the program comprising instructions that cause a computer of the conference support device to perform:
receiving, from the plurality of the conference terminals, captured images that are captured by image capture devices of the conference terminals and in each of which at least one of the conference participants is visible;
receiving, from a first conference terminal that is one of the plurality of the conference terminals, a voice that is generated by a first participant, the first participant being one of the conference participants and being using the first conference terminal, the voice being input from a voice input device of the first conference terminal;
identifying words that are included in the received voice by voice recognition processing;
creating text data that express the identified words;
specifying a second participant who is a different conference participant from the first participant based on a result of voice recognition processing, the second participant corresponding to the identified words and being at least one of the conference participants;
creating a display image that is to be displayed on display devices of the plurality of the conference terminals from the captured images that have been received, and in which the text data that have been created are associated with a first portion of the captured image that corresponds to the first participant and a specified image is associated with a second portion of the captured image that corresponds to the second participant, the specified image being an image that indicates that the second participant is addressed by the first participant; and
transmitting the created display image to the plurality of the conference terminals, in order for the display image to be displayed on the display devices of the plurality of the conference terminals.

15. The non-transitory computer-readable medium according to claim 14, wherein
the specified image is a blank display frame in which text will be displayed, and
the creating the display image includes creating the display image by associating the blank display frame with the second portion of the captured image that corresponds to the second participant.

16. The non-transitory computer-readable medium according to claim 14, wherein
the specifying the second participant includes, in a case where the identified words by the voice recognition processing include a first specified word, specifying all of the conference participants except the first participant as the second participant, and
the creating the display image includes, in a case where all of the conference participants except the first participant are specified as the second participant, creating the display image by associating the specified image with the second portion of the captured image that correspond to the second participant.

17. The non-transitory computer-readable medium according to claim 14, wherein
the receiving the voice includes receiving, along with the voice that is generated by the first participant, information that specifies the first participant; and
the creating the display image includes:
specifying the first portion of the captured image that corresponds to the first participant, based on a participant image that is associated with the information that specifies the first participant, among participant images that are stored in a storage portion, the participant images being images of the conference participants and being associated with information that specifies the conference participants, respectively, and
associating the text data with the specified first portion of the captured image.

18. The non-transitory computer-readable medium according to claim 14, wherein
the instructions further cause the computer of the conference support device to perform:
selecting, as a second participant image, from among participant images that are stored in a storage portion, one of the participant images that is associated with information that specifies the second participant, the participant images being images of the conference participants and being associated with information that specifies the conference participants, respectively,
wherein the creating the display image includes:
associating the text data with the first portion of the captured image that corresponds to the first participant, and associating the selected second participant image, as the specified image, with the first portion of the captured image that corresponds to the first participant.

19. The non-transitory computer-readable medium according to claim 18, wherein the receiving the voice includes receiving, along with the voice that is generated by the first participant, information that specifies the first participant, and the creating the display image includes:

specifying the first portion of the captured image that corresponds to the first participant, based on one of the participant images that is associated with the information that specifies the first participant, among the participant images that are stored in the storage portion, and associating the text data and the selected second participant image with the specified first portion of the captured image.

20. The non-transitory computer-readable medium according to claim 14, wherein the specifying the second participant includes:

determining whether a silent state has been continued for a specified time immediately after a second specified word was spoken, and specifying, in a case where the silent state has been continued for the specified time, the second participant based on the second specified word.

* * * * *